United States Patent
Hong et al.

(10) Patent No.: US 12,410,924 B2
(45) Date of Patent: Sep. 9, 2025

(54) AIR PURIFIER INCLUDING BIDIRECTIONAL DISCHARGE FLOW PATH AND METHOD OF CONTROLLING THE SAME

(71) Applicant: COWAY CO., LTD., Gongju-si (KR)

(72) Inventors: Hyun Jin Hong, Seoul (KR); Sang Woo Kang, Seoul (KR); An Ho Cho, Seoul (KR); Do Yeop Kim, Seoul (KR); Ji Hye Jeong, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 1290 days.

(21) Appl. No.: 17/256,503

(22) PCT Filed: Jun. 13, 2019

(86) PCT No.: PCT/KR2019/007160
§ 371 (c)(1),
(2) Date: Dec. 28, 2020

(87) PCT Pub. No.: WO2020/004839
PCT Pub. Date: Jan. 2, 2020

(65) Prior Publication Data
US 2021/0278096 A1    Sep. 9, 2021

(30) Foreign Application Priority Data
Jun. 29, 2018    (KR) .................. 10-2018-0075872

(51) Int. Cl.
*F24F 8/10*    (2021.01)
*B01D 46/44*    (2006.01)
(Continued)

(52) U.S. Cl.
CPC .............. *F24F 8/10* (2021.01); *B01D 46/442* (2013.01); *B01D 46/46* (2013.01); *F24F 8/80* (2021.01); *B01D 2279/50* (2013.01)

(58) Field of Classification Search
None
See application file for complete search history.

(56) References Cited

U.S. PATENT DOCUMENTS 5,626,820 A * 5/1997 Kinkead ................ F24F 3/167
                                                55/318
5,692,954 A * 12/1997 Lee ......................... B08B 5/02
                                                55/385.2
(Continued)

FOREIGN PATENT DOCUMENTS

CN    203810661 U    9/2014
CN    203964199 U *  11/2014
(Continued)

OTHER PUBLICATIONS

Espacenet translation of CN 203964199 (Year: 2014).*
(Continued)

*Primary Examiner* — Brit E. Anbacht
(74) *Attorney, Agent, or Firm* — Oblon, McClelland, Maier &Neustadt, L.L.P.

(57) ABSTRACT

Provided are an air purifier and a method of controlling the same. Specifically, there are provided an air purifier including a plurality of air purification modules (10), wherein each of the plurality of air purification modules (10) includes: a blowing fan (100); a flow path dividing portion (200) on which the blowing fan (100) is rotatably mounted; a flow path portion (300) including a first flow path portion (310) located at one side of the flow path dividing portion (200) and a second flow path portion (320) located at the other side opposite the blowing fan (100) with respect to the one side of the flow path dividing portion (200); and a housing (400) accommodating the blowing fan (100), the flow path dividing portion (200), and the flow path portion (300) therein, wherein the housing (400) includes a first opening (410)

(Continued)

located at one side of the housing (400) and providing a passage through which the first flow path portion (310) is connected in fluid communication with an outside of the housing (400) and a second opening (420) located at the other side of the housing (400) and providing a passage through which the second flow path portion (320) is connected in fluid communication with the outside of the housing (400), and the first flow path portion (310) includes a first flow path opening/closing portion (312) located at one side opposite to the blowing fan (100), and the second flow path portion (320) includes a second flow path opening/closing portion (322) located at one side opposite to the blowing fan (100), and the first flow path opening/closing portion (312) is located between a first open position in which the first opening (410) is opened, and a first closing position in which the first opening (410) is closed, and the second flow path opening/closing portion (322) is located between a second open position in which the second opening (420) is opened, and a second closing position in which the second opening (420) is closed, and the first flow path opening/closing portion (312) and the second flow path opening/closing portion (322) of each of the plurality of air purification modules (10) are operated independently, and a method of controlling the same.

11 Claims, 15 Drawing Sheets

(51) Int. Cl.
  *B01D 46/46* (2006.01)
  *F24F 8/80* (2021.01)

(56) References Cited

U.S. PATENT DOCUMENTS

| | | | | |
|---|---|---|---|---|
| 5,876,280 | A * | 3/1999 | Kitano | H01L 21/67017 |
| | | | | 414/217 |
| 6,607,435 | B2 | 8/2003 | Yokoyama et al. | |
| 6,755,734 | B2 | 6/2004 | Yokoyama et al. | |
| 2018/0256770 | A1 | 9/2018 | Jang | |
| 2020/0129909 | A1 * | 4/2020 | Hong | F04D 25/166 |

FOREIGN PATENT DOCUMENTS

| | | | | | |
|---|---|---|---|---|---|
| CN | 210801440 | U | | 6/2020 | |
| EP | 3 040 632 | A1 | | 7/2016 | |
| EP | 3904774 | A1 | * | 11/2021 | ......... F24F 11/0008 |
| JP | 8-334238 | A | | 12/1996 | |
| JP | 2001-239118 | A | | 9/2001 | |
| JP | 2002-174443 | A | | 6/2002 | |
| JP | 2003-65577 | A | | 3/2003 | |
| JP | WO-2015063868 | A1 | * | 5/2015 | ............. F24F 11/77 |
| KR | 2002-0079167 | A | | 10/2002 | |
| KR | 10-2002-0097465 | A | | 12/2002 | |
| KR | 10-2005-0091172 | A | | 9/2005 | |
| KR | 10-2007-0112329 | A | | 11/2007 | |
| KR | 10-2009-0088187 | A | | 8/2009 | |
| KR | 10-2010-0123053 | A | | 11/2010 | |
| KR | 10-2016-0069010 | A | | 6/2016 | |
| KR | 20160069010 | A | * | 6/2016 | |
| KR | 10-2017-0057028 | A | | 5/2017 | |
| KR | 10-1830095 | 81 | | 2/2018 | |
| KR | 10-2018-0065164 | A | | 6/2018 | |
| KR | 10-2018-0138247 | A | | 12/2018 | |
| KR | 10-2018-0138248 | A | | 12/2018 | |
| KR | 20220015157 | A | * | 2/2022 | ............. F24F 13/02 |
| WO | WO 2015/063868 | A1 | | 5/2015 | |
| WO | WO-2018207237 | A1 | * | 11/2018 | ............. F24F 11/77 |

OTHER PUBLICATIONS

Espacenet translation of Kr 2016/0069010A (Year: 2016).*
Espacenet translation of WO 2015/063868A1 (Year: 2015).*
Combined Chinese Office Action and Search Report issued Aug. 3, 2021 in Chinese Patent Application No. 201980044074.6 (with English translation of Categories of Cited Documents), 10 pages.
Extended European Search Report issued Feb. 28, 2022 in corresponding European Patent Application No. 19824811.4, 9 pages.
International Search Report Issued on Sep. 25, 2019 in PCT/KR2019/007160 filed on Jun. 13, 2019, 2 pages.
Office Action issued Mar. 19, 2021 in corresponding Korean Patent Application No. 10-2018-0075872, 5 pages.
Korean Office Action issued on Feb. 15, 2021 in Korean Patent Application No. 10-2020-0164994, 5 pages.

* cited by examiner (a)             (b)

(a)　　　　　　　　　(b)

(a)　　　　　　　(b)

(a)　　　　　　　　　(b)

AIR PURIFIER INCLUDING BIDIRECTIONAL DISCHARGE FLOW PATH AND METHOD OF CONTROLLING THE SAME

CROSS-REFERENCE TO RELATED PATENT APPLICATION

This application claims the benefit of Korean Patent Application No. 10-2018-0075872, filed on Jun. 29, 2018 in the Korean Intellectual Property Office, the disclosure of which is incorporated herein in its entirety by reference.

BACKGROUND OF THE INVENTION

1. Field of the Invention

The present disclosure relates to an air purifier and a method of controlling the same, and more particularly, to an air purifier in which purification of indoor air may be performed in several manners through an air purifier equipped with a plurality of air purification modules capable of performing various modes using a bidirectional discharge flow path, and a method of controlling the same.

2. Description of the Related Art

Interest in indoor air quality is increasing with an increase in fine dust. In the related art, ventilation is performed by opening a window and introducing outside air to improve indoor air quality. However, it is difficult to expect a great effect to purify the indoor air through ventilation as the concentration of fine dust contained in the outside air increases.

Thus, air purifiers have received much attention as a way to improve indoor air quality without ventilation through windows. Air purifiers perform a function of purifying the indoor air by including a HEPA filter, a dust filter, etc. therein, filtering the indoor air inhaled into a device, and then discharging the filtered air again.

In addition, a technique for a method of performing air purification for a space of various areas by diversifying the air purification ability of the air purifier has been disclosed. This is because the area of the indoor space in which the air purifier is located is not always the same, and thus the efficiency of indoor air purification cannot be maximized with an air purifier having a fixed air purification ability according to the related art.

Korean Patent Laid-open Publication No. 10-2018-0065164 discloses a complex-type air purifier in which an air purifier for an electrostatic main body and a low-temperature plasma-type portable air purifier can be used in combination with each other.

However, in this type of air purifier, purification methods of the air purifier for a main body and the portable air purifier are different from each other. Thus, although when the air purifier for the main body and the portable air purifier are combined with each other, the maximization of the effect of air purification can be achieved, functions to be performed by each module are different from each other so that there is a limitation in that the efficiency of air purification can be improved only when air purification is performed by moving both modules.

Korean Patent Registration No. 10-1830095 discloses a small air purifier having a compact shape to be movable.

However, when this type of air purifier is used in a small space, it can be expected to improve the efficiency of air purification, but when used in a large space, there is a limitation in capacity to perform air purification with one air purifier. Thus, there is still a limitation in the further inclusion of an additional air purifier.

(Patent document 1) Korean Patent Laid-open Publication No. 10-2018-0065164 (published on Jun. 18, 2018)
(Patent document 2) Korean Patent Registration No. 10-1830095 (registered on Feb. 12, 2018)

SUMMARY OF THE INVENTION

The present disclosure provides an air purifier in which air purification modules capable of performing an air purification function independently are coupled to each other or stacked according to the area of various indoor spaces so that the capacity of air purification may be diversified according to the situation of the indoor spaces, and a method of controlling the same.

According to an aspect of the present disclosure, there is provided an air purifier including a plurality of air purification modules (10), wherein each of the plurality of air purification modules (10) includes: a blowing fan (100); a flow path dividing portion (200) on which the blowing fan (100) is rotatably mounted; a flow path portion (300) including a first flow path portion (310) located at one side of the flow path dividing portion (200) and a second flow path portion (320) located at the other side opposite the blowing fan (100) with respect to the one side of the flow path dividing portion (200); and a housing (400) accommodating the blowing fan (100), the flow path dividing portion (200), and the flow path portion (300) therein, wherein the housing (400) includes a first opening (410) located at one side of the housing (400) and providing a passage through which the first flow path portion (310) is connected in fluid communication with an outside of the housing (400) and a second opening (420) located at the other side of the housing (400) and providing a passage through which the second flow path portion (320) is connected in fluid communication with the outside of the housing (400), and the first flow path portion (310) includes a first flow path opening/closing portion (312) located at one side opposite to the blowing fan (100), and the second flow path portion (320) includes a second flow path opening/closing portion (322) located at one side opposite to the blowing fan (100), and the first flow path opening/closing portion (312) is located between a first open position in which the first opening (410) is opened, and a first closing position in which the first opening (410) is closed, and the second flow path opening/closing portion (322) is located between a second open position in which the second opening (420) is opened, and a second closing position in which the second opening (420) is closed, and the first flow path opening/closing portion (312) and the second flow path opening/closing portion (322) of each of the plurality of air purification modules (10) are operated independently.

Each air purification module (10) may further include a sensor unit (500), the sensor unit (500) including a motion sensor (510) and a dust sensor (520), and the first flow path opening/closing portion (312) and the second flow path opening/closing portion (322) of each of the plurality of air purification modules (10) may be operated independently according to one or more of motion information and dust information detected by the sensor unit (500).

One or more of whether or not to apply power to the blowing fan (100) and the rotation speed of the blowing fan (100) of each of the plurality of air purification modules (10) may be independently controlled.

The air purification module (10) may include a sensor unit (500), the sensor unit (500) including a motion sensor (510) and a dust sensor (520), and one or more of whether or not to apply power to the blowing fan (100) and the rotation speed of the blowing fan (100) of each of the plurality of air purification modules (10) may be independently controlled according to motion information and dust information detected by the sensor unit (500).

According to another aspect of the present disclosure, there is provided a method of controlling an air purifier (1), the air purifier (1) including a plurality of air purification modules (10) of claim 1, the method including: (a) operating the blowing fan (100) by using a blowing fan control module (610); and (b) operating one or more of the first flow path opening/closing portion (312) and the second flow path opening/closing portion (322) by using a flow path portion control module (620).

The air purifier (1) may be operable in a normal mode, and in the normal mode, in (b), the flow path portion control module (620) may control the flow path portion (300) to open both the first flow path opening/closing portion (312) and the second flow path opening/closing portion (322).

The plurality of air purification modules (10) may be stacked in a vertical direction, and the air purifier (1) may be operable in a rapid purification mode, and in the rapid purification mode, in (b), the flow path portion control module (620) may control directions of a fluid discharged from the first flow path portion (310) and the second flow path portion (320) of the air purification module (11) located at an upper side among the plurality of air purification modules (10) of the air purifier (1) to be upward and may control directions of the fluid discharged from the first flow path portion (310) and the second flow path portion (320) of the air purification module (12) located at a lower side among the plurality of air purification modules (10) of the air purifier (1) to be downward.

The air purifier (1) may be operable in a remote purification mode, and in the remote purification mode, in (b), the flow path portion control module (620) may control directions of the fluid discharged from the first flow path portion (310) and the second flow path portion (320) to be upward.

The air purifier (1) may be operable in a near-field purification mode, and in the near-field purification mode, in (b), the flow path portion control module (620) may control directions of the fluid discharged from the first flow path portion (310) and the second flow path portion (320) to be downward.

The plurality of air purification modules (10) may be stacked in a vertical direction, and the air purifier (1) may be operable in a near-field intensive purification mode, and in the near-field intensive purification mode, in (b), the blowing fan control module (610) may control the rotation speed of the blowing fan (100) of the air purification module (12) located at a lower side among the plurality of air purification modules (10) of the air purifier (1) to be higher than the rotation speed of the blowing fan (100) of the air purification module (11) located at an upper side.

According to another aspect of the present disclosure, there is provided a method of controlling an air purifier (1), the air purifier (1) including a plurality of air purification modules (10), the method including: (a) detecting one or more of motion information and dust information by using the sensor unit (500); (b) calculating the rotation speed of the blowing fan (100), directions of a fluid discharged from the first flow path portion (310) and the second flow path portion (320), and positions of the first flow path opening/closing portion (312) and the second flow path opening/closing portion (322) using the motion information detected by the sensor unit (500), wherein the calculating is performed by a motion calculation module (630); (c) controlling the blowing fan (100) according to the calculated rotation speed of the blowing fan (100) by using the blowing fan control module (610); and (d) controlling the first flow path portion (310), the second flow path portion (320), the first flow path opening/closing portion (312), and the second flow path opening/closing portion (322) according to the calculated directions of the fluid discharged from the first flow path portion (310) and the second flow path portion (320) and the calculated positions of the first flow path opening/closing portion (312) and the second flow path opening/closing portion (322), wherein the controlling is performed by the flow path portion control module (620).

According to another aspect of the present disclosure, there is provided a method of controlling an air purifier (1), the air purifier (1) including a plurality of air purification modules (10), the method including: (a) detecting one or more of motion information and dust information by using the sensor unit (500); (b) calculating the rotation speed of the blowing fan (100), directions of a fluid discharged from the first flow path portion (310) and the second flow path portion (320), and positions of the first flow path opening/closing portion (312) and the second flow path opening/closing portion (322) using the dust information detected by the sensor unit (500), wherein the calculating is performed by an air quality calculation module (640); (c) controlling the blowing fan (100) according to the calculated rotation speed of the blowing fan (100) by using the blowing fan control module (610); and (d) controlling the first flow path portion (310), the second flow path portion (320), the first flow path opening/closing portion (312), and the second flow path opening/closing portion (322) according to the calculated directions of the fluid discharged from the first flow path portion (310) and the second flow path portion (320) and the calculated positions of the first flow path opening/closing portion (312) and the second flow path opening/closing portion (322), wherein the controlling is performed by the flow path portion control module (620).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an air purification module, an air purifier, and a method of controlling the air purifier according to one or more embodiments will be described in detail with reference to the drawings.

The terms "front side", "rear side", "left side", "right side", "top side" and "bottom side" used in the following description will be understood with reference to a coordinate system shown in FIG. 1.

The term "capacity" used in the following description encompasses all concepts capable of quantitatively expressing the amount that the air purifier or air purification module can perform, such as the volume of air, volume, and indoor area.

The term "outside air" used in the following description refers to contaminated air that is located outside an air purification module 10 and has not undergone an air purification process.

The term "clean air" used in the following description refers to air that has undergone an air purification process by the air purification module 10.

The term "common size dust" used in the following description refers to dust having a relatively larger particle size than "fine dust".

1. Description of Air Purification Module 10

The air purification module 10 may independently perform air purification by including components that perform each function for performing air purification therein.

In addition, the air purification module 10 according to an embodiment of the present disclosure is provided as a single module unit, so that an air purification function itself may be performed, and when a large air purification capacity is required according to the use of the air purification module 10, a plurality of air purification modules 10 are stacked up and down or coupled to each other to constitute an air purifier 1 having different capacities, and a detailed description thereof will be described later.

Figure 1:
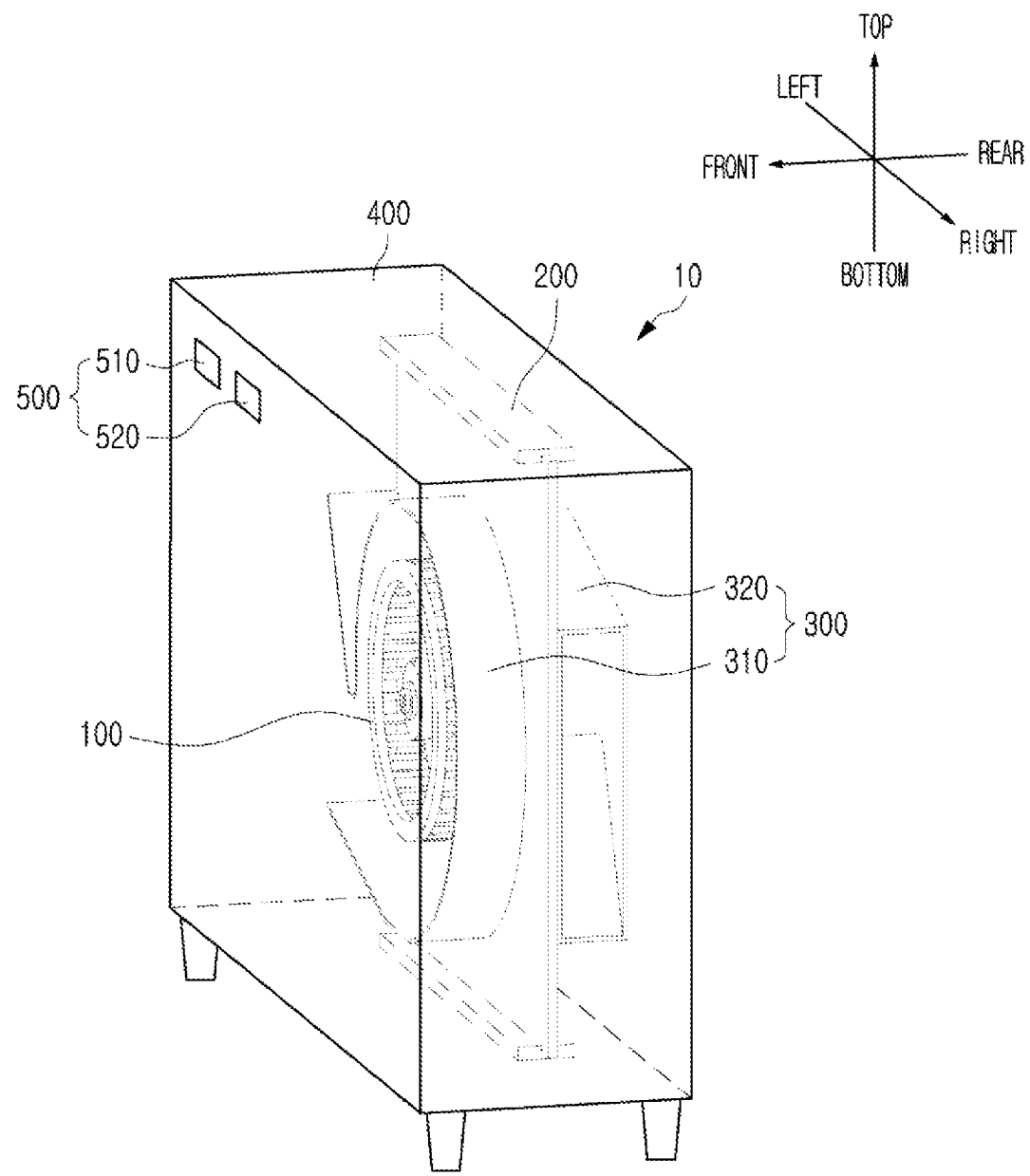
FIG. 1 is a perspective view showing an air purification module according to an embodiment.
Figure 2:
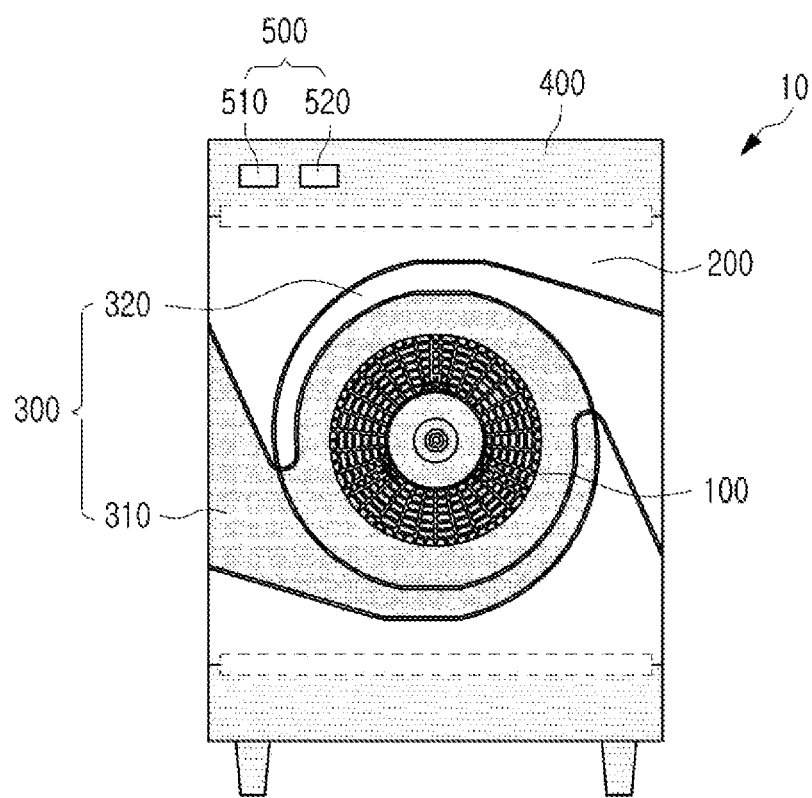
FIG. 2 is a front view showing the front of the air purification module of FIG. 1.

Referring to FIGS. 1 and 2, the air purification module 10 according to the illustrated embodiment includes a blowing fan 100, a flow path dividing portion 200, a flow path portion 300, a housing 400, and a sensor unit 500. In addition, as will be described later, the air purification module 10 according to an embodiment of the present disclosure further includes a controller 600 (see FIG. 10).

(1) Description of Blowing Fan 100

Referring to FIGS. 1 through 5, the air purification module 10 according to the Illustrated embodiment includes a blowing fan 100.

The blowing fan 100 inhales the outside air of the air purification module 10, and after a purification process for the outside air inhaled by a filter unit (not shown) is performed, the blowing fan 100 provides power for discharging clean air to the outside of the air purification module 10.

The blowing fan 100 is accommodated inside the housing 400 to be described later.

In order to perform a process of purifying the outside air inhaled by the blowing fan 100, a separate filter unit (not shown) may be located in an appropriate position, such as inside or outside the blowing fan 100.

In the illustrated embodiment, the blowing fan 100 is provided as a cylindrical shape in which a plurality of blades are formed on an outer circumferential surface thereof, but the shape of the blowing fan 100 may be provided as another structure capable of inhaling the outside air and re-discharging the inhaled air.

As will be described later, an air passage (not shown) for providing a flow path through which air passes, may be formed in the housing 400 to be described later for inhalation of the outside air by the blowing fan 100.

A motor 110 is provided in the center of the blowing fan 100 to provide power for rotating the blowing fan 100. Preferably, the position and capacity of the motor 110 are determined according to the shape and size of the blowing fan 100.

The blowing fan 100 is rotatably coupled to the flow path dividing portion 200 to be described later by a separate fastening member (not shown).

Figure 8:
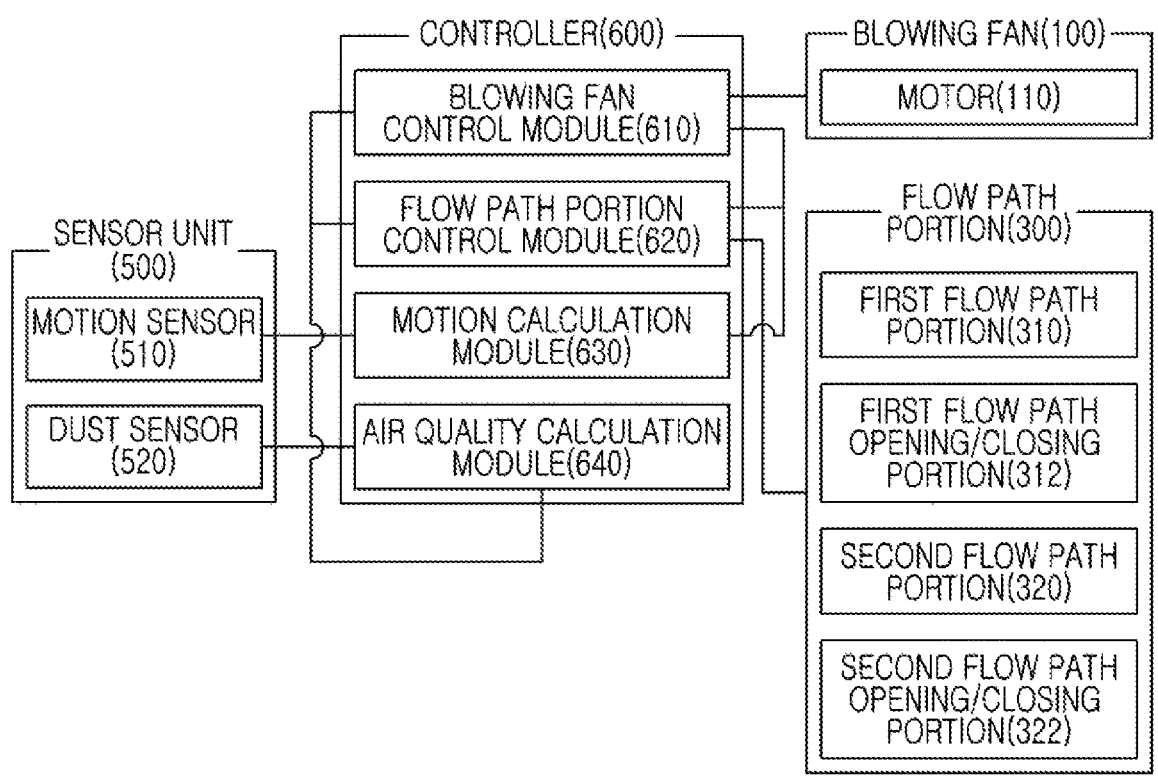
FIG. 8 is a block diagram showing the configuration of a controller of the air purification module of FIG. 1.

Referring to FIG. 8, in an embodiment, the blowing fan 100 may inhale the outside air from the front side and the rear side (A) and discharge the clean air to the left and right sides (B).

As will be described later, a plurality of air purification modules 10 may be provided to function as the air purifier 1. In this case, any one or more of whether or not to apply power to the blowing fan 100 of each air purification module 10 and the rotation speed of the blowing fan 100 may be independently controlled.

(2) Description of Flow Path Dividing Portion 200

Referring to FIGS. 1 through 5, the air purification module 10 according to the illustrated embodiment includes a flow path dividing portion 200.

Figure 3:
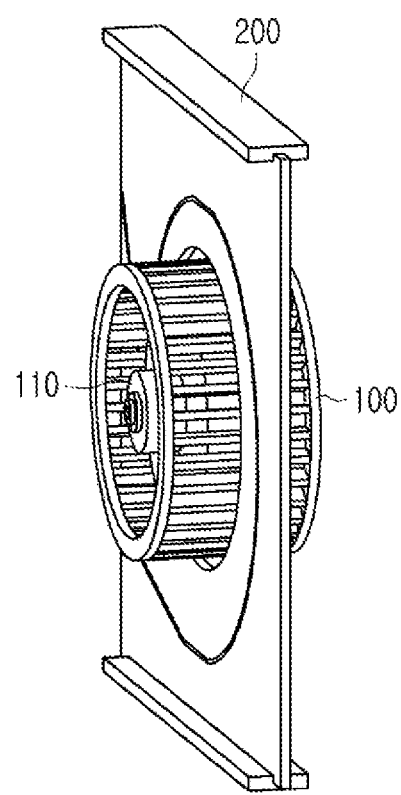
FIG. 3 is a perspective view showing the coupling relationship between a blowing fan and a flow path dividing portion of the air purification module of FIG. 1.

The blowing fan 100 is rotatably coupled to the flow path dividing portion 200, and a flow path portion 300, which will be described later, is coupled to the flow path dividing portion 200 so that the outside air introduced by the blowing fan 100 undergoes a purification process and then may be discharged through the flow path portion 300 to be described later (see FIG. 3).

In the illustrated embodiment, the flow path dividing portion 200 is formed by coupling an upper plate material, a lower plate material, and a plate material coupled to the blowing fan 100 positioned therebetween, but the shape and size of the flow path dividing portion 200 may be changed.

The flow path dividing portion 200 is accommodated inside the housing 400 to be described later.

The flow path dividing portion 200 includes a first flow path portion coupling groove 210 and a second flow path portion coupling groove 220.

1) Description of First Flow Path Portion Coupling Groove 210

Figure 4:
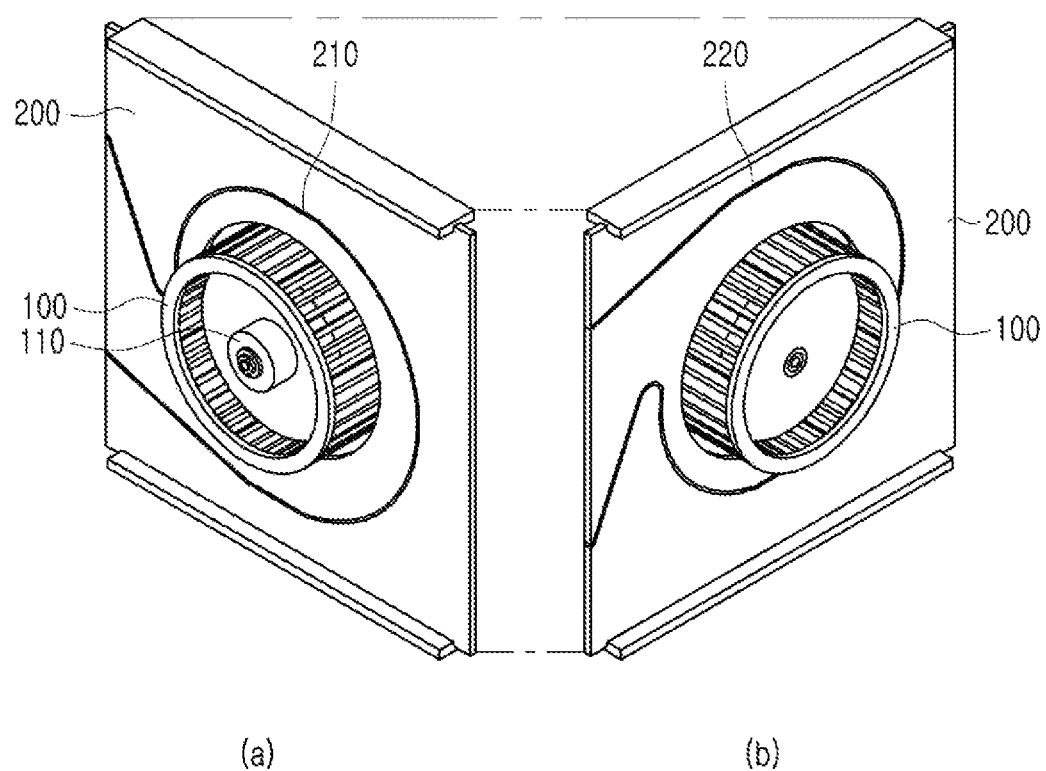
FIG. 4 is a front view and a rear view showing the blowing fan and the flow path dividing portion of FIG. 3.

Referring further to FIG. 4, the first flow path portion coupling groove 210 is a groove formed in the flow path dividing portion 200, and the first flow path portion 310 of the flow path portion 300 to be described later is coupled to the first flow path portion coupling groove 210. In the illustrated embodiment, the first flow path portion coupling groove 210 is formed on one surface of the front side of the flow path dividing portion 200, and the position of the first flow path portion coupling groove 210 may be changed.

In one embodiment, the first flow path portion 310 to be described later may be inserted into and coupled to the first flow path portion coupling groove 210. In addition to this, various types of coupling methods may be used, but in consideration of maintenance and the like, preferably, the first flow path portion 310 to be described later is detachably coupled to the first flow path portion coupling groove 210.

Preferably, the position and shape of the first flow path portion coupling groove 210 are formed to correspond to the position and shape of the first flow path portion 310 to be described later.

In addition, the shape of the first flow path portion coupling groove 210 is preferably formed to be complementary to the second flow path portion coupling groove 220 to be described later. This is to allow the clean air to be discharged in both directions by using the air purification module 10 according to an embodiment of the present invention.

In addition, when the first flow path portion 310 to be described later is coupled to the first flow path portion coupling groove 210, the clean air discharged from the blowing fan 100 may be discharged to the outside of the air purification module 10 through one or more of the first flow path portion 310 and the second flow path portion 320 to be described later, and a detailed description thereof will be described later.

2) Description of Second Flow Path Portion Coupling Groove 220

Referring further to FIG. 4, the second flow path portion coupling groove 220 is a groove formed in the flow path dividing portion 200, and the second flow path portion 320 of the flow path portion 300 to be described later is coupled to the second flow path portion coupling groove 220. In the illustrated embodiment, the second flow path portion coupling groove 220 is formed on one surface of the rear side of the flow path dividing portion 200, and the position of the second flow path portion coupling groove 220 may be changed.

However, preferably, the position of the second flow path portion coupling groove 220 is complementary to the position of the first flow path portion coupling groove 210.

In an embodiment, the second flow path portion 320 to be described later may be inserted and coupled to the second flow path portion coupling groove 220. In addition to this, various types of coupling methods may be used, but in consideration of maintenance and the like, preferably, the second flow path portion 320 to be described later is detachably coupled to the second flow path portion coupling groove 220.

The position and shape of the second flow path portion coupling groove 220 are preferably formed to correspond to the position and shape of the second flow path portion 320 to be described later.

In addition, the shape of the second flow path portion coupling groove 220 is preferably formed to be complementary to the first flow path portion coupling groove 210. This is to allow the clean air to be discharged in both directions by using the air purification module 10 according to an embodiment of the present disclosure.

Specifically, as in the illustrated embodiment, when the first flow path portion coupling groove 210 is formed to face the left side, the second flow path portion coupling groove 220 is preferably formed to face the right side. Contrary to this, when the first flow path portion coupling groove 210 is formed to face the right side, the second flow path portion coupling groove 220 is preferably formed to face the left side.

In addition, when the second flow path portion 320 to be described later is coupled to the second flow path portion coupling groove 220, the clean air discharged from the blowing fan 100 may be discharged to the outside of the air purification module 10 through one or more of the first flow path portion 310 and the second flow path portion 320 to be described later, and a detailed description thereof will be described later.

(3) Description of Flow Path Portion 300

Figure 5:
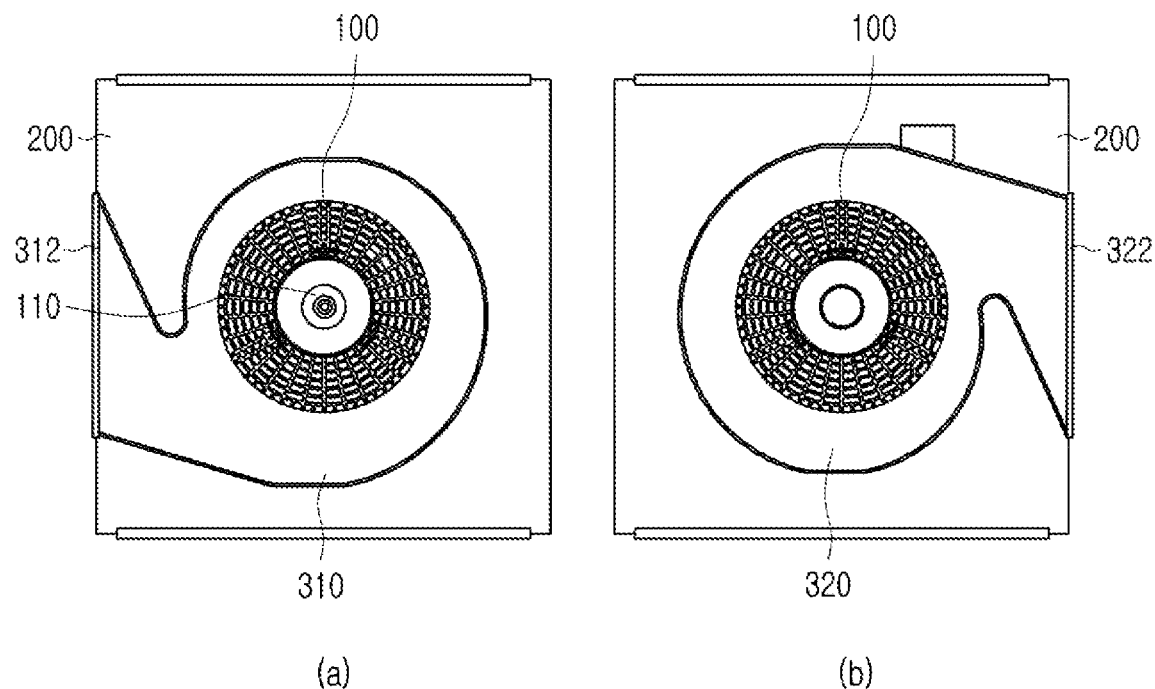
FIG. 5 is a view showing a state in which a flow path portion is coupled to the flow path dividing portion of FIG. 3.
Figure 6:
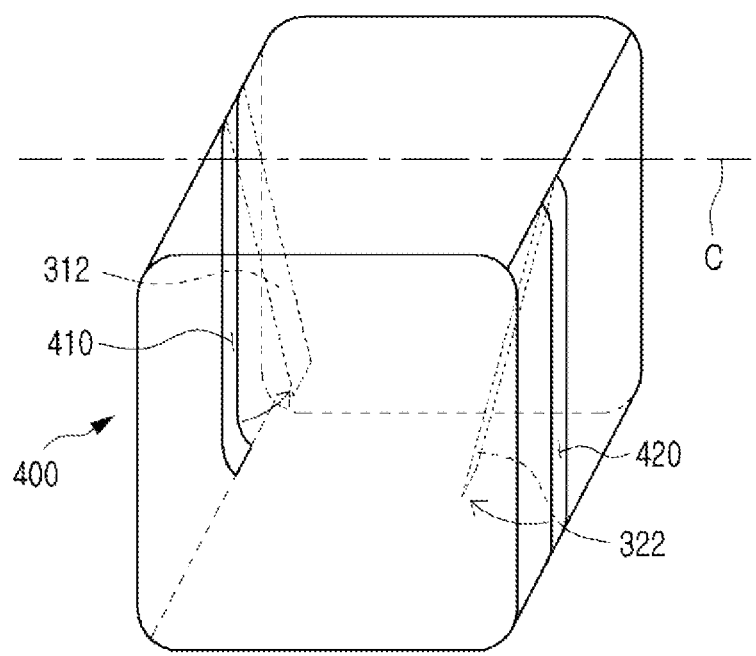
FIG. 6 is a view showing a first flow path opening/closing portion, a second flow path opening/closing portion, and a housing of the air purification module of FIG. 1.

Referring to FIGS. 1, 2, and 5, the air purification module 10 according to the illustrated embodiment includes a flow path portion 300.

The flow path portion 300 includes a first flow path portion 310 and a second flow path portion 320 to be described later, and after the outside air inhaled by the blowing fan 100 undergoes an air purification process, the flow path portion 300 forms a flow path through which the clean air is discharged to the outside of the air purification module 10.

In addition, the air purification module 10 according to an embodiment of the present disclosure may select one or more directions in which the clean air is discharged. To this end, a first flow path opening/closing portion 312 and a second flow path opening/closing portion 322 for closing at least one flow path portion 300 are provided.

The term "move" used in the following description means that the position is changed from a specific position to another position.

1) Description of First Flow Path Portion 310

The first flow path portion 310 forms a flow path through which the clean air that has been inhaled by the blowing fan 100 and has undergone a purification process is discharged to the outside from the air purification module 10 according to an embodiment of the present disclosure.

In the illustrated embodiment, the first flow path portion 310 is provided in the form of a case and is inserted into the first flow path portion coupling groove 210 of the flow path dividing portion 200, and is positioned at the front side of the blowing fan 100.

Looking at the shape of the first flow path portion 310, a portion surrounding the blowing fan 100 is formed in a circular shape corresponding to the shape of the blowing fan 100, and the left side of the first flow path portion 310 is extended to be adjacent to the left side of the housing 400 to be described later and is provided in the form of a cochlea connected in fluid communication with a first opening 410 of the housing 400 to be described later, but it is natural that the shape of the first flow path portion 310 may be changed.

The first flow path opening/closing portion 312 is provided to be movable in a portion where the first flow path portion 310 is positioned adjacent to the left side of the housing 400 to be described later.

The first flow path opening/closing portion 312 opens or closes the first opening 410 of the housing 400 to be described later, thereby allowing or preventing the clean air from being discharged through the first flow path portion 310.

The first flow path opening/closing portion 312 may be opened or closed by rotating the first opening 410 of the housing 400 to be described later, but other methods such as opening and closing the first opening 410, for example, a form capable of slide movement or folder-type movement may be provided.

The first flow path opening/closing portion 312 may move between a first open position in which the first opening 410 of the housing 400 to be described later is completely opened, and a first closed position in which the first opening 410 to be described later is completely closed.

In other words, the first flow path opening/closing portion 312 may be positioned to completely open, completely close, or partially open the first opening 410 to be described later. Accordingly, the flow rate of the clean air discharged from the first flow path portion 310 may be adjusted.

The movement of the first flow path opening/closing portion 312 may be performed independently from the movement of the second flow path opening/closing portion 322 to be described later. In addition, as will be described later, when the air purification module 10 according to an embodiment of the present disclosure is operated to perform various modes, in a specific mode, the movement of the first flow path opening/closing portion 312 may be performed to correspond to the movement of the second flow path opening/closing portion 322 to be described later.

A detailed description of the relationship between the movement of the first flow path opening/closing portion 312 and the second flow path opening/closing portion 322 to be described later and the movement of the first flow path opening/closing portion 312 and the second flow path opening/closing portion 322 in each mode will be described later.

2) Description of Second Flow Path Portion 320

The second flow path portion 320 forms a flow path through which the clean air that has been inhaled by the blowing fan 100 and has undergone a purification process is discharged to the outside from the air purification module 10 according to an exemplary embodiment of the present disclosure.

In the illustrated embodiment, the second flow path portion 320 is provided in the form of a case and is inserted into the second flow path portion coupling groove 220 of the flow path dividing portion 200 to be located at the rear side of the blowing fan 100.

Looking at the shape of the second flow path portion 320, a portion surrounding the blowing fan 100 is formed in a circular shape corresponding to the shape of the blowing fan 100, and the left side of the second flow path portion 320 is extended to be adjacent to the right side of the housing 400 to be described later and is provided in the form of a cochlea connected in fluid communication with the second opening 420 of the housing 400 to be described later, but it is natural that the shape of the second flow path portion 320 may be changed.

A second flow path opening/closing portion 322 is provided to be movable at a portion where the second flow path portion 320 is positioned adjacent to the right side of the housing 400 to be described later.

The second flow path opening/closing portion 322 opens or closes the second opening 420 of the housing 400 to be described later, thereby allowing or preventing the clean air from being discharged through the second flow path portion 320.

The second flow path opening/closing portion 322 may be opened or closed by rotating the second opening 420 of the housing 400 to be described later, but other methods such as opening and closing the second opening 420, for example, a form capable of slide movement or folder-type movement may be provided.

The second flow path opening/closing portion 322 may move between a second open position in which the second opening 420 of the housing 400 to be described later is completely opened, and a second closed position in which the second opening 420 to be described later is completely closed.

In other words, the second flow path opening/closing portion 322 may be positioned to completely open, completely close, or partially open the second opening 420 to be described later. Accordingly, the flow rate of the clean air discharged from the second flow path portion 320 may be adjusted.

The movement of the second flow path opening/closing portion 322 may be performed independently from the movement of the first flow path opening/closing portion 312. In addition, as will be described later, when the air purification module 10 according to an embodiment of the present disclosure is operated to perform various modes, in a specific mode, the movement of the second flow path opening/closing portion 322 is performed to correspond to the movement of the first flow path opening/closing portion 312.

A detailed description of the relationship between the movement of the first flow path opening/closing portion 312 and the second flow path opening/closing portion 322 and the movement of the first flow path opening/closing portion 312 and the second flow path opening/closing portion 322 in each mode will be described later.

(4) Description of Housing 400

Referring to FIGS. 1, 2, 6, and 7, the air purification module 10 according to the illustrated embodiment includes a housing 400.

The housing 400 forms the outside of the air purification module 10 and accommodates the blowing fan 100, the flow path dividing portion 200, and the flow path portion 300 therein. In addition, the controller 600 to be described later may also be accommodated inside the housing 400.

In addition, the sensor unit 500 to be described later in the illustrated embodiment is provided on the upper side of the front side of the housing 400.

The housing 400 may be formed of a transparent material. This is because, when the air purification module 10 is used, the time when purification, maintenance, etc. of the blowing fan 100, the filter unit (not shown), the flow path dividing portion 200, and the flow path portion 300 are required, may be easily checked according to the passage of time.

As will be described later, the air purification module 10 according to the embodiment of the present disclosure may be stacked up and down to be coupled to each other, and for this purpose, a coupling member (not shown) may be provided on the lower side of the housing 400.

Alternatively, in consideration of the case where one air purification module 10 is independently used, a holding member (not shown) may be provided under the housing 400.

In the illustrated embodiment, the housing 400 is provided in the shape of a cube or a rectangular parallelepiped, but the shape of the housing 400 may be changed.

However, considering that the air purification module 10 according to the embodiment of the present disclosure is provided in a modular manner and may be coupled to each other according to the required capacity, although any shape is provided, preferably, a shape suitable for being coupled to each other is provided.

Preferably, at least one side of the housing 400 is provided with an opening (not shown) for forming a flow path through which air may pass, so that the outside air may be inhaled by the blowing fan 100.

In one embodiment, the blowing fan 100 inhales the outside air from the front side and the rear side of the housing 400. Thus, preferably, at least one opening (not shown) is provided on the front side and the rear side of the housing 400.

The housing 400 includes a first opening 410, a second opening 420, a front housing 430, and a rear housing 440.

1) Description of First Opening 410

The first opening 410 is an opening provided on the left side of the housing 400, and provides a passage through which the first flow path portion 310 of the flow path portion 300 is connected in fluid communication with the outside of the housing 400. In the illustrated embodiment, the first opening 410 is formed to be elongated in a vertical direction on the left side of the housing 400, but the position and shape of the first opening 410 may be changed.

However, in any case, the position and shape of the first opening 410 is preferably determined to correspond to the position and shape of the first flow path portion 310.

The first opening 410 may be completely open or completely closed by the first flow path opening/closing portion 312. Also, the first opening 410 may be partially opened by the first flow path opening/closing portion 312.

To this end, the first flow path opening/closing portion 312 is provided to be movable on one side of the first opening 410 as described above.

In the illustrated embodiment, the first flow path opening/closing portion 312 is rotatably coupled to an upper side of the first opening 410 to open or close the first opening 410, but a method of opening or closing the first opening 410 by using the first flow path opening/closing portion 312 may be changed.

In another embodiment, the first flow path opening/closing portion 312 may open or close the first opening 410 by sliding or folder-type movement.

Opening and closing of the first opening 410 and the second opening 420 to be described later may be performed independently of each other. In addition, as will be described later, when the air purification module 10 according to an embodiment of the present disclosure is operated to perform various modes, in a specific mode, opening and closing of the first opening 410 may be performed to correspond to opening and closing of the second opening 420.

A detailed description of the relationship between the opening and closing of the first opening 410 and the second opening 420 to be described later and the opening and closing of the first opening 410 and the second opening 420 to be described later in each mode will be described later.

2) Description of Second Opening 420

The second opening 420 is an opening provided on the right side of the housing 400, and provides a passage through which the second flow path portion 320 of the flow path portion 300 is connected in fluid communication with the outside of the housing 400. In the illustrated embodiment, the second opening 420 is formed to be elongated in the vertical direction on the right side of the housing 400, but the position and shape of the second opening 420 may be changed.

However, in any case, the position and shape of the second opening 420 are preferably determined to correspond to the position and shape of the second flow path portion 320.

The second opening 420 may be completely open or completely closed by the second flow path opening/closing portion 322. In addition, the second opening 420 may be partially opened by the second flow path opening/closing portion 322.

To this end, the second flow path opening/closing portion 322 is provided to be movable on one side of the second opening 420 as described above.

In the illustrated embodiment, the second flow path opening/closing portion 322 is rotatably coupled to the upper side of the second opening 420 to open or close the second opening 420, but a method of opening or closing the second opening 420 by using the second flow path opening/closing portion 322 may be changed.

In another embodiment, the second flow path opening/closing portion 322 may open or close the second opening 420 by sliding or folder-type movement.

Opening and closing of the first opening 410 and the second opening 420 may be performed independently of each other. In addition, as will be described later, when the air purification module 10 according to an embodiment of the present disclosure is operated to perform various modes, in a specific mode, opening and closing of the second opening 420 may be performed to correspond to opening and closing of the first opening 410.

A detailed description of the relationship between opening and closing of the first opening 410 and the second opening 420 and opening and closing of the first opening 410 and the second opening 420 in each mode will be described later.

3) Description of Front Housing 430 and Rear Housing 440

Figure 7:
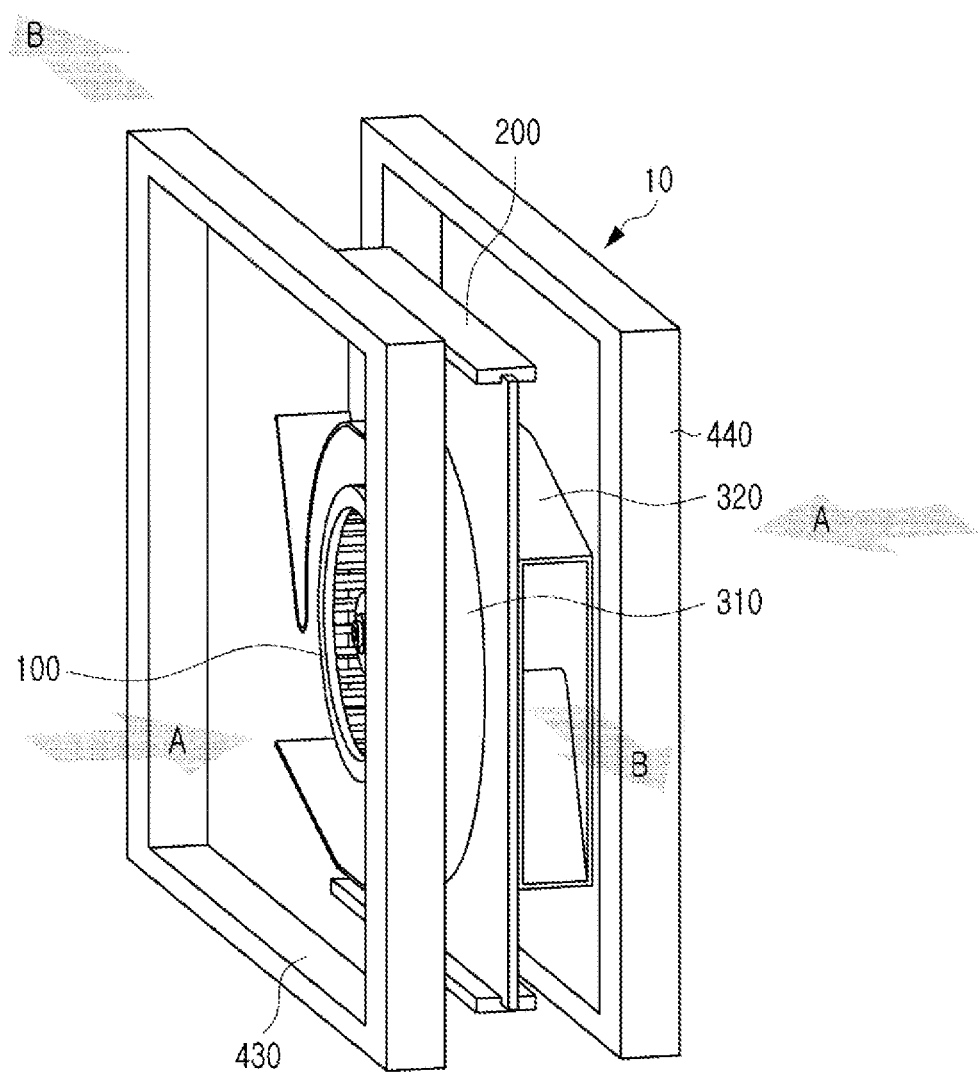
FIG. 7 is a view showing operations of the air purification module of FIG. 1.

Referring to FIG. 7, the housing 400 according to the illustrated embodiment further includes a front housing 430 and a rear housing 440.

The front housing 430 and the rear housing 440 support the coupled blowing fan 100, the flow path dividing portion 200, and the flow path portion 300 so that they can stably maintain a coupled state.

The shapes of the front housing 430 and the rear housing 440 are preferably determined to correspond to the shape of the housing 400, and the front housing 430 and the rear housing 440 are preferably provided to stably support the combined blowing fan 100, the flow path dividing portion 200, and the flow path portion 300 therein.

(5) Description of Sensor Unit 500

Referring back to FIGS. 1 and 2, the air purification module 10 according to the illustrated embodiment includes a sensor unit 500.

The sensor unit 500 detects the indoor situation in which the air purification module 10 is located, and transmits information according to the information to the controller 600 to be described later, so that the indoor air may be purified in various ways according to the indoor situation.

In the illustrated embodiment, the sensor unit 500 includes a motion sensor 510 and a dust sensor 520, but may further include a temperature sensor (not shown), a humidity sensor (not shown), and the like.

In the illustrated embodiment, the sensor unit 500 is located on the upper side of the front side of the housing 400, but the position of the sensor unit 500 may be changed to another position in which an indoor situation may be detected. In addition, a sensor unit 500 may be provided on each side of the housing 400.

1) Description of Motion Sensor 510

The motion sensor 510 detects whether a person or an object around the air purification module 10 moves or is moved and the degree of movement.

In the illustrated embodiment, since the motion sensor 510 is located on the front side of the air purification module 10, it will be detected whether an object moves in the front of the air purification module 10.

Likewise, when the position of the motion sensor 510 is changed, the motion sensor 510 will detect whether the object at the position is moved or not.

As a result of detection by the motion sensor 510, when movement of an object is detected, since a person or an animal is moving in the front side of the air purification module 10, more dust generation may be expected.

In addition, as a result of detection by the motion sensor 510, when there is no movement of the object for a long time, it may be expected that more dust will be accumulated on the floor.

The result detected by the motion sensor 510 is transmitted to the controller 600 to be described later, and is used to select an operating method of the air purification module 10. A detailed description of this process will be described later.

2) Description of Dust Sensor 520

The dust sensor 520 detects the concentration of dust around the air purification module 10. The dust sensor 520 includes a fine dust sensor (not shown) for detecting the concentration of fine dust, and a general dust sensor (not shown) for detecting the concentration of dust with a common size, and the accuracy of detection thereof may be improved.

In the illustrated embodiment, since the dust sensor 520 is located on the front side of the air purification module 10, the dust concentration in the front of the air purification module 10 will be detected.

Likewise, when the position of the dust sensor 520 is changed, the dust sensor 520 will detect the dust concentration at that position.

As a result of the detection by the dust sensor 520, when a large amount of fine dust is detected, it may be expected that the amount of dust floating in the indoor space will be larger than that of common size dust.

In addition, as a result of the detection by the dust sensor 520, when a large amount of dust with a common size is detected, it may be expected that the amount of dust floating or deposited on the bottom or floor of the indoor space is larger than that of the fine dust.

The result of detection by the dust sensor 520 is transmitted to the controller 600 to be described later, and is used to determine an operating method of the air purification module 10. A detailed description of this process will be described later.

(6) Description of Controller 600

Referring to FIG. 8, the air purification module 10 according to an embodiment of the present disclosure further includes a controller 600.

The controller 600 calculates an operating method of the air purification module 10 by using motion information and dust information detected by the motion sensor 510 and the dust sensor 520 of the sensor unit 500.

In one embodiment, the controller 600 may be provided with a microprocessor, a central processing unit (CPU), or the like.

In order to calculate the operating method of the air purification module 10 by using the information sensed by the sensor unit 500 and to operate the air purification module 10 accordingly, the controller 600 may be electrically connected to the sensor unit 500, the blowing fan 100, and the flow path portion 300 to transmit and receive information to and from one another.

The controller 600 is provided in each of air purification modules 10. A detailed description thereof will be described later.

The controller 600 includes a blowing fan control module 610, a flow path portion control module 620, a motion calculation module 630, and an air quality calculation module 640.

1) Description of Blowing Fan Control Module 610

The blowing fan control module 610 calculates whether power is applied to the blowing fan 100 or not, whether the blowing fan 100 rotates or not, and the rotation speed of the blowing fan 100 (hereinafter, referred to as "control information of the blowing fan 100").

Reference information for controlling the blowing fan 100 is directly input by a user, or the calculation result value of the motion calculation module 630 to be described later using motion information detected by the motion sensor 510, and the calculation result value of the air quality calculation module 640 to be described later using the detected dust information detected by the dust sensor 520 are used as the reference information for controlling the blowing fan 100.

The control information of the blowing fan 100 calculated by the blowing fan control module 610 is transmitted to the blowing fan 100, and the blowing fan 100 is operated according to the calculated control information of the blowing fan 100

2) Description of Flow Path Portion Control Module 620

The flow path portion control module 620 calculates information for forming one or more flow paths (hereinafter, referred to as "control information of the flow path portion 300") so that the clean air may be discharged through one or more of the first flow path portion 310 and the second flow path 320 of the flow path portion 300.

Reference information for controlling the flow path portion 300 is directly input by the user, or the calculation result value of the motion calculation module 630 to be described later using motion information detected by the motion sensor 510, and the calculation result value of the air quality calculation module 640 to be described later using the detected dust information detected by the dust sensor 520 are used as the reference information for controlling the flow path portion 300.

Specifically, the flow path portion control module 620 calculates the number of flow paths through which the clean air is to be discharged, and accordingly determines whether or not to open at least one of the first flow path portion 310 and the second flow path portion 320.

In addition, whether or not to move at least one of the first flow path opening/closing portion 312 and the second flow path opening/closing portion 322 is determined according to the flow path portion determined to be opened, and the degree of movement of first flow path opening/closing portion 312 and the second flow path opening/closing portion 322, i.e., the position of each of the first flow path opening/closing portion 312 and the second flow path opening/closing portion 322 is calculated according to the discharge direction or angle of the clean air.

Whether or not to open and close at least one of the first flow path portion 310 and the second flow path portion 320 calculated by the flow path portion control module 620, whether or not to operate the first flow path opening/closing portion 312 and the second flow path opening/closing portion 322 according to the opening or closing, and the positions of the first flow path opening/closing portion 312 and the second flow path opening/closing portion 322, and the control information of the flow path portion 300 are transmitted to the flow path portion 300 so that the flow path portion 300 is operated according to the control information of the flow path portion 300 calculated by the flow path portion control module 620.

3) Description of Motion Calculation Module 630

The motion calculation module 630 calculates reference information for calculating control information of the blowing fan 100 and control information of the flow path portion 300 by using the motion information detected by the motion sensor 510.

Hereinafter, a process of calculating the reference information for generating the control information of the blowing fan 100 and the control information of the flow path portion 300 by the motion calculation module 630 according to the detection result of the motion sensor 510 will be described as an example.

Specifically, as a result of detection by the motion sensor 510, when movement of an object is detected, since a person or an animal is moving in the front side of the air purification module 10, more dust generation may be expected.

In this case, reference information for rotating the blowing fan 100 at a high speed is calculated, and whether or not to open and close the first flow path portion 310 and the second flow path portion 320 and the discharge direction of the clean air are calculated according to the distance of the position where the movement of the object is detected.

In addition, as a result of detection by the motion sensor 510, when there is no movement of the object for a long time, it may be expected that more dust will be accumulated on the floor.

In this case, the reference information for rotating the blowing fan 100 at a high speed is calculated, and whether or not open and close the first flow path portion 310 and the second flow path portion 320 and the discharge direction of the clean air are calculated according to the distance of the position where there is no movement of the object.

Of course, the rotation speed of the blowing fan 100 according to the detection result of the motion sensor 510 may be changed. For example, by operating the blowing fan 100 at a low speed for a long time, the efficiency of indoor air purification may be improved.

Likewise, the flow path portion 300 to be opened and closed and the direction of the flow path portion 300 are also changed to correspond to various modes as will be described later, so that the efficiency of indoor air purification may be improved.

The reference information calculated by the motion calculation module 630 is transmitted to the blowing fan control module 610 and the flow path portion control module 620, respectively, and is used as reference data for calculating control information of the blowing fan 100 and control information of the flow path portion 300, respectively.

4) Description of Air Quality Calculation Module 640

The air quality calculation module 640 calculates reference information for calculating control information of the blowing fan 100 and control information of the flow path portion 300 by using the dust information detected by the dust sensor 520.

Hereinafter, a process of calculating reference information for generating the control information of the air blowing fan 100 and the control information of the flow path portion 300 by the air quality calculation module 640 according to the detection result of the dust sensor 520 will be described as an example.

Specifically, as a result of detection by the dust sensor 520, when the concentration of the fine dust is larger than the concentration of common size dust, it may be expected that the indoor air is mainly contaminated by the fine dust.

In this case, the fine dust is more likely to be floating in the indoor space than common size dust, and it may be determined that the fine dust may be removed even when air is discharged at a low speed.

Therefore, the reference information for rotating the blowing fan 100 at a low speed is calculated, and the discharge direction is calculated so that the air discharged from the flow path portion 300 is directed toward the middle to the upper side so that the air discharged from the flow path portion 300 may be directed toward a space portion instead of the indoor floor.

In addition, as a result of detection by the dust sensor 520, when the concentration of common size dust is larger than the concentration of the fine dust, the indoor air may be expected to be mainly contaminated by common size dust.

In this case, dust with a common size is more likely to be floating on the lower side of the indoor space or accumulated on the floor compared to fine dust, and it may be determined that the dust with the common size may be more effectively removed when air is discharged at a high speed.

Accordingly, reference information for rotating the blowing fan 100 at a high speed is calculated, and the discharge direction is calculated so that the air discharged from the flow path portion 300 faces the middle to the lower side, or the floor, not the indoor space portion.

Of course, the rotation speed of the blowing fan 100 according to the detection result of the dust sensor 520 may be changed. For example, by operating the blowing fan 100 at a low speed for a long time or at a high speed for a short time, the efficiency of indoor air purification may be improved.

Likewise, the flow path portion 300 to be opened and closed and the direction of the flow path portion 300 are also changed to correspond to various modes as will be described later, so that the efficiency of indoor air purification may be improved.

The reference information calculated by the air quality calculation module 640 is transmitted to the blowing fan control module 610 and the flow path portion control module 620, respectively, and is used as reference data for calculating the control information of the blowing fan 100 and the control information of the flow path portion 300, respectively.

2. Description of Air Purifier 1

Hereinafter, an air purifier 1 according to an embodiment of the present disclosure will be described in detail with reference to FIG. 9.

A plurality of air purification modules 10 according to the illustrated embodiment are provided and stacked in the vertical direction, thereby configuring the air purifier 1.

Figure 9:
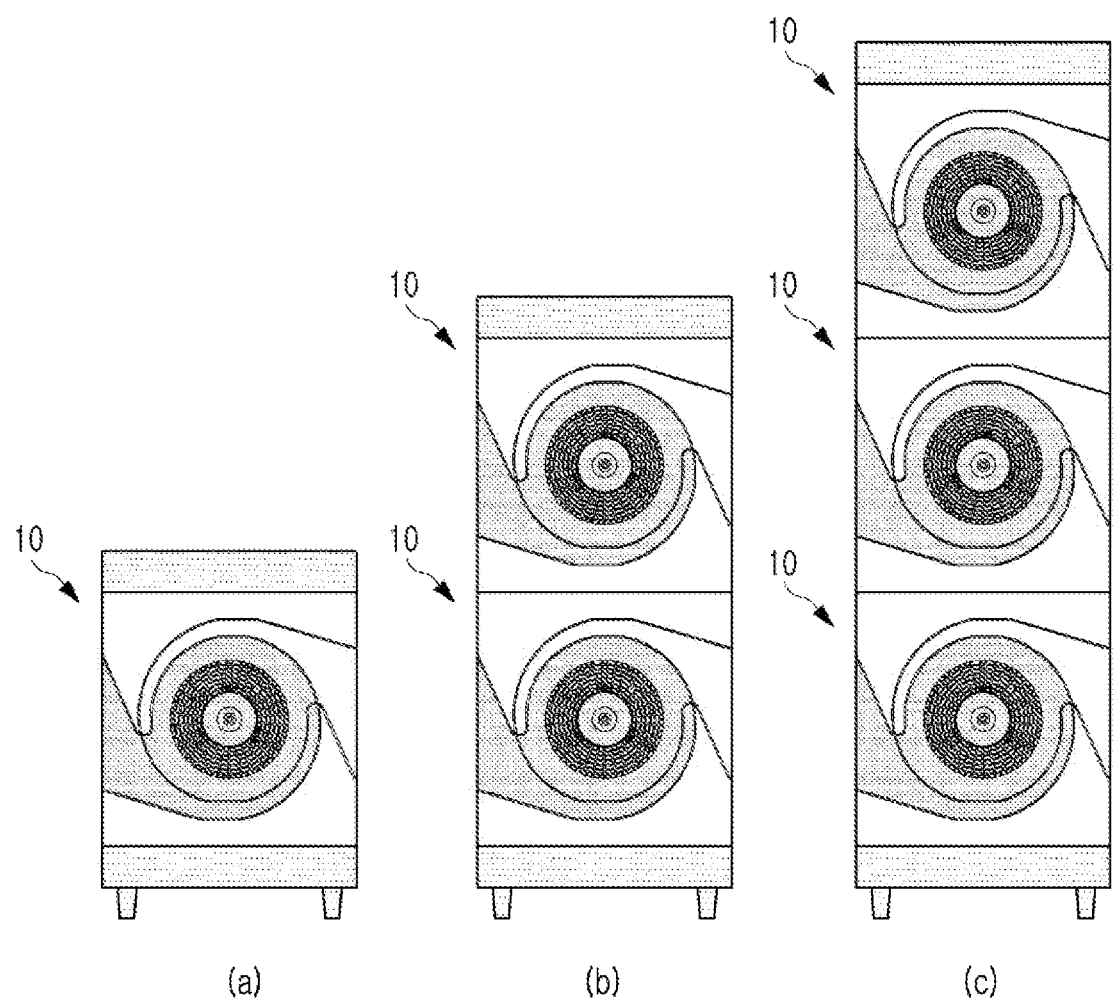
FIG. 9 is a view showing an air purifier in which a plurality of air purification modules of FIG. 1 are provided and stacked.

Referring to (a) of FIG. 9, the case where one air purification module 10 is provided and the air purifier 1 is used in a small space or narrow room, is illustrated.

Referring to (b) of FIG. 9, the case where two air purification modules 10 are provided and the air purifier is used in a medium space or medium-sized room, is illustrated.

Referring to (c) of FIG. 9, the case where three air purification modules 10 are provided and the air purifier 1 is used in a large space or large-sized room, is illustrated.

In the illustrated embodiment, up to three air purification modules 10 are provided, but the number of air purification modules 10 may be changed, and the air purifier 1 may be stacked in the vertical direction or continuously combined in left and right directions, as in the illustrated embodiment.

Of course, when the plurality of air purification modules 10 are successively arranged in the left and right directions to form the air purifier 1, the position of the flow path portion 300 needs to be changed accordingly.

Each of the plurality of air purification modules 10 may be independently operated. That is, each air purification module 10 independently includes each of the above-described components, and the blowing fan 100, the flow path portion 400, and the sensor unit 500 of each air purification module 10 may be operated independent of one another.

In particular, since the plurality of air purification modules 10 are stacked in the vertical direction, motion information and dust information may be detected at each height, and accordingly, the height of the clean air discharged from the flow path portion 300 can also be variously configured. Therefore, the air purifier 1 may be controlled in various ways by the above-described controller 600, and a detailed description thereof will be described later.

Alternatively, in the plurality of air purification modules 10 that constitute the air purifier 1, the discharge direction of the clean air and the rotation speed of each blowing fan 100 may be controlled depending on each other.

3. Description of Operating Mode of Air Purifier 1

Hereinafter, a method of controlling the air purifier 1 according to the illustrated embodiment will be described with reference to FIGS. 10 through 13.

Figure 10:
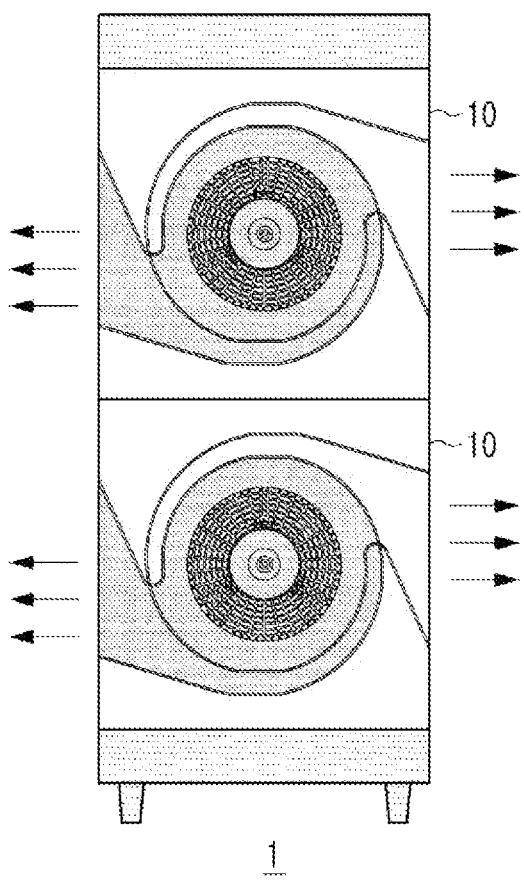
FIG. 10 is a view showing operations of a normal mode of the air purifier according to an embodiment.
Figure 11:
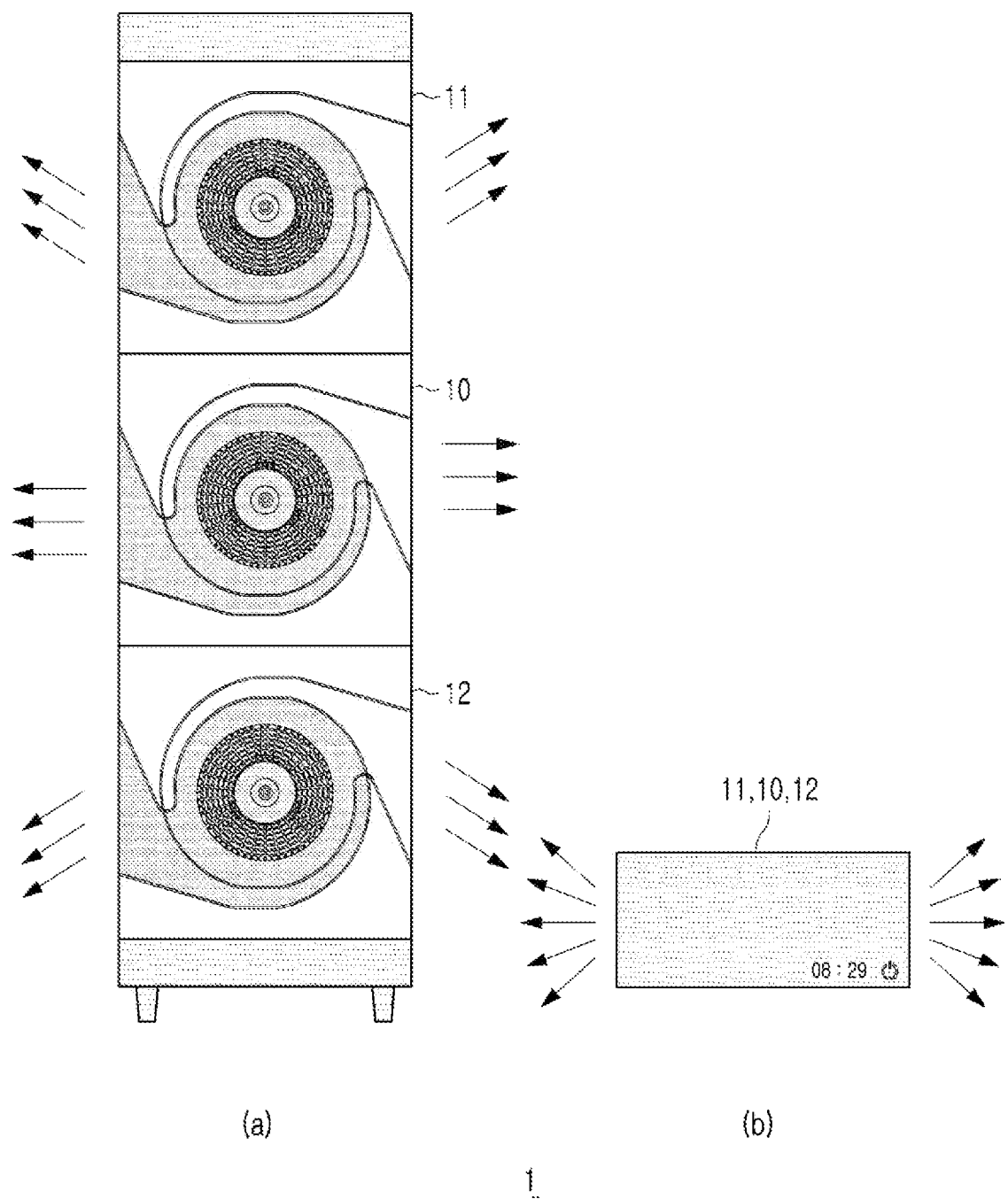
FIG. 11 is a front view (a) and a plan view (b) showing operations of the air purifier according to an embodiment in a rapid purification mode.
Figure 12:
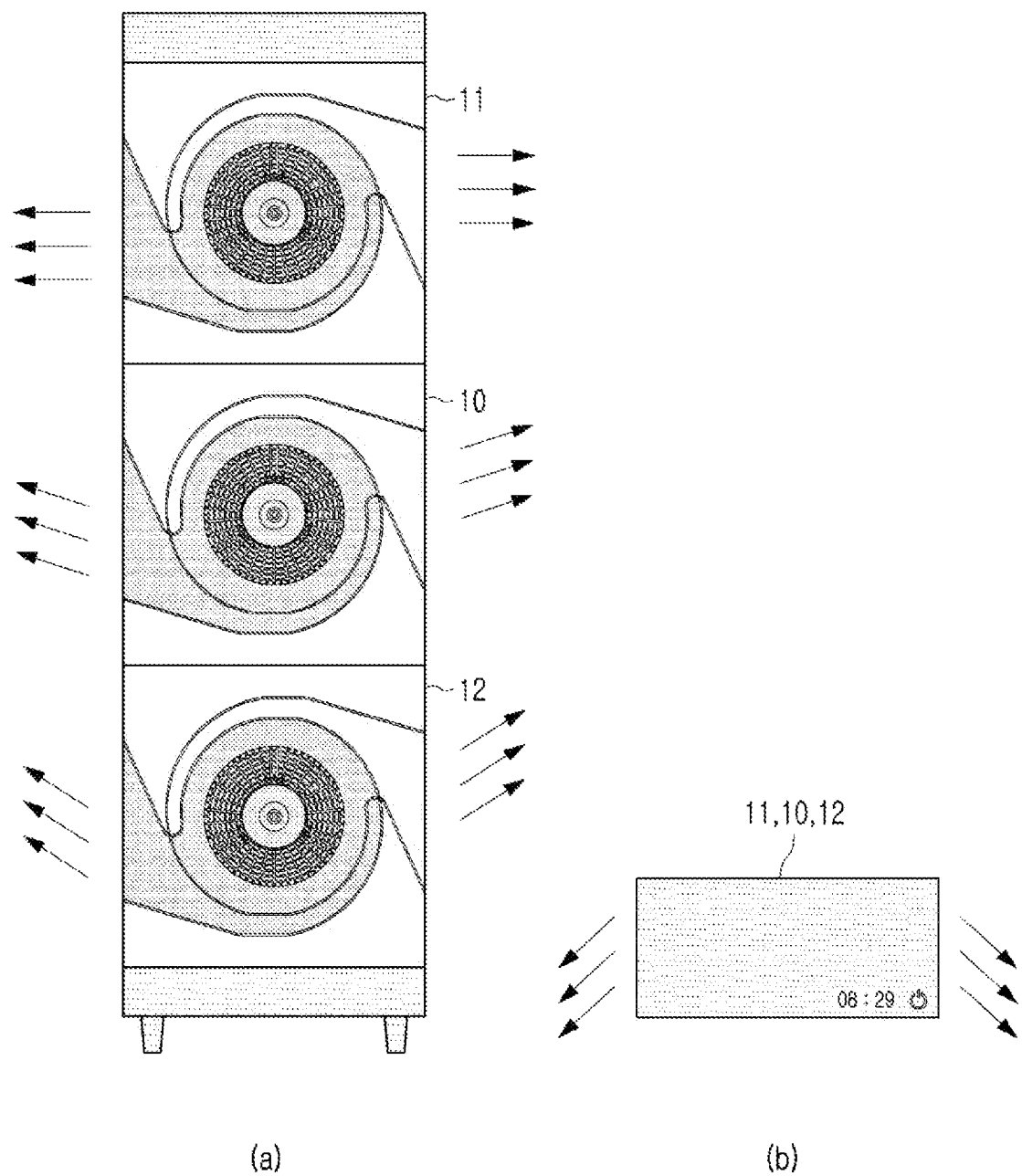
FIG. 12 is a front view (a) and a plan view (b) showing operations of the air purifier according to an embodiment in a remote purification mode.
Figure 13:
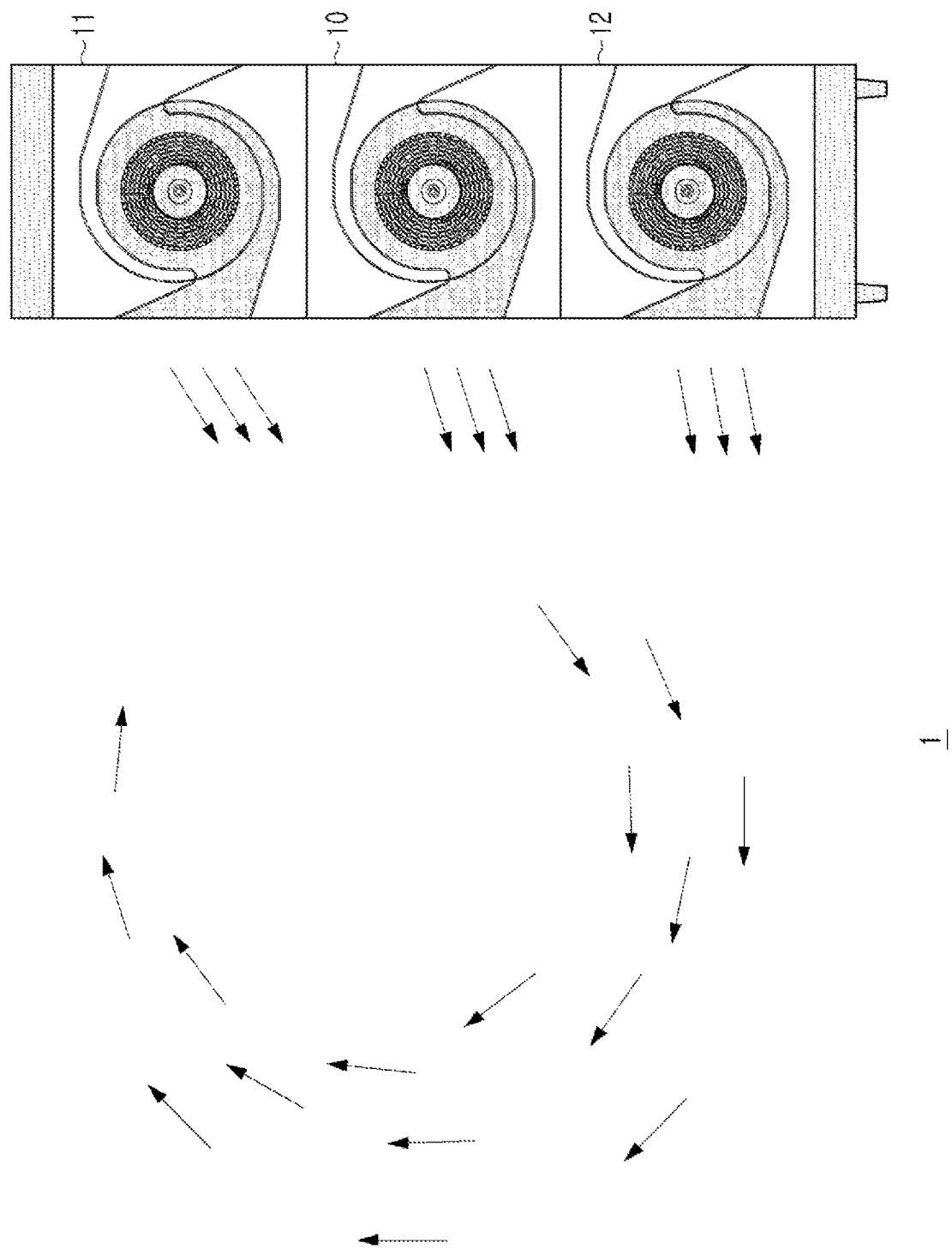
FIG. 13 is a view showing operations of the air purifier according to an embodiment in a near-field purification mode and a near-field intensive purification mode.

FIGS. 10 through 13 each show an operating mode of the air purifier 1 according to an embodiment of the present disclosure, and FIG. 10 shows a normal mode, FIG. 11 shows a rapid purification mode, FIG. 12 shows a remote purification mode, and FIG. 13 shows a near-field purification mode and a near-field intensive purification mode, respectively.

In the illustrated embodiment, the air purifier 1 is configured by stacking two to three air purification modules 10 in the vertical direction, respectively, but the number of air purifiers may be changed, as described above.

Each mode described below may be input by the user through a separate input unit (not shown) or may be automatically performed according to conditions of indoor air detected by the sensor unit 500.

(1) Description of Normal Mode

Referring to FIG. 10, a process in which the air purifier 1 according to the illustrated embodiment is operated in a normal mode, is illustrated.

The normal mode is a mode for maintaining average or general indoor air quality.

First, the blowing fan control module 610 controls the blowing fan 100 to rotate. In this case, the rotation speed of the blowing fan 100 may be determined according to the information detected by the sensor unit 500 or may be arbitrarily determined, such as determined according to the user's input.

In addition, the flow path portion control module 620 moves one or more of the first flow path opening/closing portion 312 and the second flow path opening/closing portion 322.

Specifically, since the normal mode is a case where the air purification module 10 is operated without any change, both the first flow path portion 310 and the second flow path portion 320 are opened so that the clean air may be discharged from both the first flow path portion 310 and the second flow path portion 320.

In this case, the opening degrees of the first flow path opening/closing portion 312 and the second flow path opening/closing portion 322 may be adjusted to be different from each other.

In addition, the directions of the clean air discharged from the first flow path portion 310 and the second flow path portion 320 also spread in a horizontal direction without any limitation.

As described above, each of the air purification modules 10 includes a first flow path portion 310 and a second flow path portion 320 on the left and right sides, and the clean air is discharged in the left and right directions of the air purification module 10.

In the case of the normal mode, since a separate control process according to external factors according to height, etc. is unnecessary, the air purification module 10 may be provided as one to configure the air purifier 1. Alternatively, the normal mode may also be operated according to the information detected by the sensor unit 500.

In addition, a plurality of such air purification modules 10 are provided and stacked in the vertical direction, two first flow path portions 310 for discharging the clean air to the left, and two second flow path portions 320 for discharging the clean air to the right are provided so that the clean air may be discharged in a total of four positions.

The air purification module 10 located at the lower side is provided with a separate holder and may be supported on the indoor floor, and the air purification module 10 located at the upper side is provided with a coupling member (not shown) and may be stably coupled to the air purification module 10 located at the lower side.

Accordingly, when the air purifier 1 is operated in the normal mode, air purification may be performed according to the average indoor air quality, Thus, the generally required indoor air quality may be maintained while minimizing power consumption.

(2) Description of Rapid Purification Mode

Referring to FIG. 11, a process in which the air purifier 1 according to the illustrated embodiment is operated in a rapid purification mode, is illustrated.

The rapid purification mode is a mode for quickly improving indoor air quality.

First, the blowing fan control module 610 controls the blowing fan 100 to rotate. In this case, the rotation speed of the blowing fan 100 may be determined according to the information detected by the sensor unit 500 or may be arbitrarily determined, such as determined according to the user's input.

Preferably, the blowing fan control module 610 may control the rotation speed of the blowing fan 100 to be maximized so that the amount of discharged clean air may be maintained to the maximum.

In addition, the flow path portion control module 620 moves one or more of the first flow path opening/closing portion 312 and the second flow path opening/closing portion 322.

Specifically, since the rapid purification mode is a mode for discharging the clean air to the entire indoor space, both the first flow path opening/closing portion 312 and the second flow path opening/closing portion 322 are opened so that the clean air may be discharged from both the first flow path portion 310 and the second flow path portion 320.

In this case, the opening degrees of the first flow path opening/closing portion 312 and the second flow path opening/closing portion 322 may be adjusted to be different from each other. However, preferably, in order to perform rapid purification, both the first flow path opening/closing portion 312 and the second flow path opening/closing portion 322 are opened so that the amount of the discharged clean air may be maximized.

As shown in (a) of FIG. 11, the air purification module 10 in this mode includes the air purification module 11 located at the top, the air purification module 10 located in the middle, and the air purification module 12 located at the lower side.

In this case, the discharge direction is controlled so that the clean air discharged from the air purification module 11 located at the top is discharged upward, and the discharge direction is controlled so that the clean air discharged from the air purification module 10 located in the middle is discharged horizontally, and discharge direction is controlled so that the clean air discharged from the air purification module 12 located at the lower side is discharged downward.

That is, each of the air purification modules 10, 11, and 12 that constitute the air purifier 1 determines the discharge direction of the clean air according to its position.

Alternatively, the discharge direction may be controlled so that the clean air discharged from the air purification module 10 located in the middle is discharged upward or downward in addition to the horizontal direction.

In addition, as shown in (b) of FIG. 11, the clean air discharged from each of the air purification modules 10, 11, 12 may be discharged toward all of the front side, the left and right sides, and the rear side.

Therefore, when the air purifier 1 is operated in the rapid purification mode, the clean air discharged from the air purifier 1 is discharged in all directions of the three-dimensional coordinate system, so that the quality of indoor air may be improved at a high speed.

(3) Description of Remote Purification Mode

Referring to FIG. 12, a process in which the air purifier 1 according to the illustrated embodiment is operated in a remote purification mode, is illustrated.

The remote purification mode is a mode for purification air in a region located at a distance from the air purifier 1.

First, the blowing fan control module 610 controls the blowing fan 100 to rotate. In this case, the rotation speed of the blowing fan 100 may be determined according to the information detected by the sensor unit 500 or may be arbitrarily determined, such as determined according to the user's input.

Preferably, the blowing fan control module 610 may control the rotation speed of the blowing fan 100 to be maximized, so that the amount of discharged clean air may be maintained to the maximum.

In addition, the flow path control module 620 moves one or more of the first flow path opening/closing portion 312 and the second flow path opening/closing portion 322.

Preferably, both the first flow path opening/closing portion 312 and the second flow path opening/closing portion 322 are opened so that the clean air may be discharged from both the first flow path portion 310 and the second flow path portion 320.

In this case, the opening degrees of the first flow path opening/closing portion 312 and the second flow path opening/closing portion 322 may be adjusted to be different from each other. However, preferably, in order to perform remote purification, both the first flow path opening/closing portion 312 and the second flow path opening/closing portion 322 are opened so that the amount of the discharged clean air may be maximized.

As shown in (a) of FIG. 12, the air purification module 10 in this mode Includes the air purification module 11 located at the top, the air purification module 10 located in the middle, and the air purification module 10 located at the lower side.

In this case, the discharge direction is controlled so that the clean air discharged from the air purification module 11 located at the top is discharged horizontally, and the discharge direction is controlled so that the clean air discharged from the air purification module 10 located in the middle is discharged upward, and the discharge direction is controlled so that the clean air discharged from the air purification module 12 located at the lower side is also discharged upward.

Specifically, since the remote purification mode is a mode for forming a flow in which the clean air circulates largely in an indoor space in order to purify the air in a region located at a distance from the air purifier 1, the discharge direction is controlled so that both the clean air discharged from each of the air purification modules 10, 11, and 12 is discharged upward.

Alternatively, the discharge direction may be controlled so that the clean air discharged from the air purification module 11 located at the top is also discharged upward instead of the horizontal direction.

In addition, as shown in (b) of FIG. 12, the clean air discharged from each air purification module 10, 11, and 12 may be discharged only toward the front side.

This is because, in this mode, preferably, the larger the flow of the clean air discharged from the air purifier 1 is, the direction of the discharged clean air is concentrated to the front side, so that easy formation of flow and large flow may be induced.

Therefore, when the air purifier 1 is operated in the remote purification mode, the clean air discharged from the air purifier 1 is discharged toward the upper side of the front, and a large flow circulating in the indoor space is formed, so that purification of the air in a region located at a distance from the air purifier 1 may be performed.

(4) Description of Near-Field Purification Mode and Near-Field Intensive Purification Mode Referring to FIG. 13, a process in which the air purifier 1 according to the illustrated embodiment is operated in a near-field purification mode or a near-field intensive purification mode, is illustrated.

The near-field purification mode or the near-field intensive purification mode is a mode for purification air in a region located at a close distance from the air purifier 1.

First, the blowing fan control module 610 controls the blowing fan 100 to rotate. In this case, the rotation speed of the blowing fan 100 may be determined according to the information detected by the sensor unit 500 or may be arbitrarily determined, such as determined according to the user's input.

Preferably, the blowing fan control module 610 may control the rotation speed of the blowing fan 100 to be maximized so that the amount of the discharged clean air may be maintained to the maximum.

In addition, the flow path portion control module 620 moves one or more of the first flow path opening/closing portion 312 and the second flow path opening/closing portion 322.

Preferably, both the first flow path opening/closing portion 312 and the second flow path opening/closing portion 322 are opened so that the clean air may be discharged from both the first flow path portion 310 and the second flow path portion 320.

In this case, the opening degrees of the first flow path opening/closing portion 312 and the second flow path opening/closing portion 322 may be adjusted to be different from each other. However, preferably, in order to perform near-field purification, both the first flow path opening/closing portion 312 and the second flow path opening/closing portion 322 are opened so that the amount of the clean air discharged from the first flow path opening/closing portion 312 and the second flow path opening/closing portion 322 may be maximized.

As shown in FIG. 13, the air purification module 10 in this mode includes an air purification module 11 located at the top, an air purification module 10 located in the middle, and an air purification module 12 located at the lower side.

In this case, the discharge direction is controlled so that the clean air discharged from the air purification module 11 located at the top is discharged downward, and the discharge direction is controlled so that the clean air discharged from the air purification module 10 located in the middle is also discharged downward, and the discharge direction is controlled so that the clean air discharged from the air purification module 12 located at the lower side is discharged horizontally or downward.

Specifically, since the near-field purification mode is a mode for forming a flow in which the clean air circulates small in an indoor space in order to purify the air in an area located at a close distance from the air purifier 1, the discharge direction is controlled so that both the clean air discharged from each of the air purification module 10, 11, and 12 is discharged downward.

Alternatively, the discharge direction may be controlled so that the clean air discharged from the air purification module 12 located at the lower side is also discharged downward instead of the horizontal direction.

In addition, in the near-field intensive purification mode for intensively purifying an area located at a short distance from the air purifier 1, there is a difference in the rotation speed of the blowing fan 100 of each of the air purification modules 10, 11, and 12.

That is, the rotation speed of the blowing fan 100 of the air purification module 12 located at the lower side is controlled to be higher than the rotation speed of the blowing fan 100 of the air purification module 11 located at the upper side, so that dust accumulated on the floor at a short distance may be more effectively removed.

Specifically, the clean air is discharged from the air purification module 12 located at the lower side at a faster speed so that the dust accumulated on the floor at a short distance may be removed as if being swept away by a blower or the like, and then the clean air discharged from the air purification module 10 located in the middle and the clean air discharged from the air purification module 11 located at the upper side catch the removed dust, flow through the indoor space, and are introduced into the air purifier 1, so that air purification may be performed.

Thus, when the air purifier 1 is operated in the near-field purification mode, the clean air discharged from the air purifier 1 is discharged downward, so that small flow removing dust from the lower side of the indoor space and circulating the indoor space is formed and thus, air purification in a region located at a short distance may be performed.

Furthermore, when the air purifier 1 is operated in the near-field intensive purification mode, the speed of the clean air discharged from the air purifier 1 differs according to the discharge height, that is, the speed of the clean air discharged from the air purification module 10 located at the lower side is controlled most rapidly, so that dust removal and air purification may be performed more effectively.

Thus, in the air purifier 1 according to the embodiment of the present disclosure, the efficiency of indoor air purification may be maximized according to the purpose through various modes of controlling the plurality of air purification modules 10 independently or correspondingly to each other.

4. Description of Process of Controlling Air Purifier 1 According to Information Detected by Sensor Unit 500

The air purification module 10 and the air purifier 1 including the same according to an embodiment of the present disclosure change a discharge method of the clean air in accordance with motion information and dust information detected by the sensor unit 500, so that the air may be purified according to the situation of an indoor space.

Hereinafter, a method of controlling the air purifier 1 according to an embodiment of the present disclosure will be described in detail with reference to FIGS. 14 and 15.

In the following description, the sensor unit 500 may detect any one or more of motion information and dust information, and preferably detect both pieces of information.

(1) Description of Process of Controlling Air Purifier 1 According to Motion Information (S100)

Figure 14:
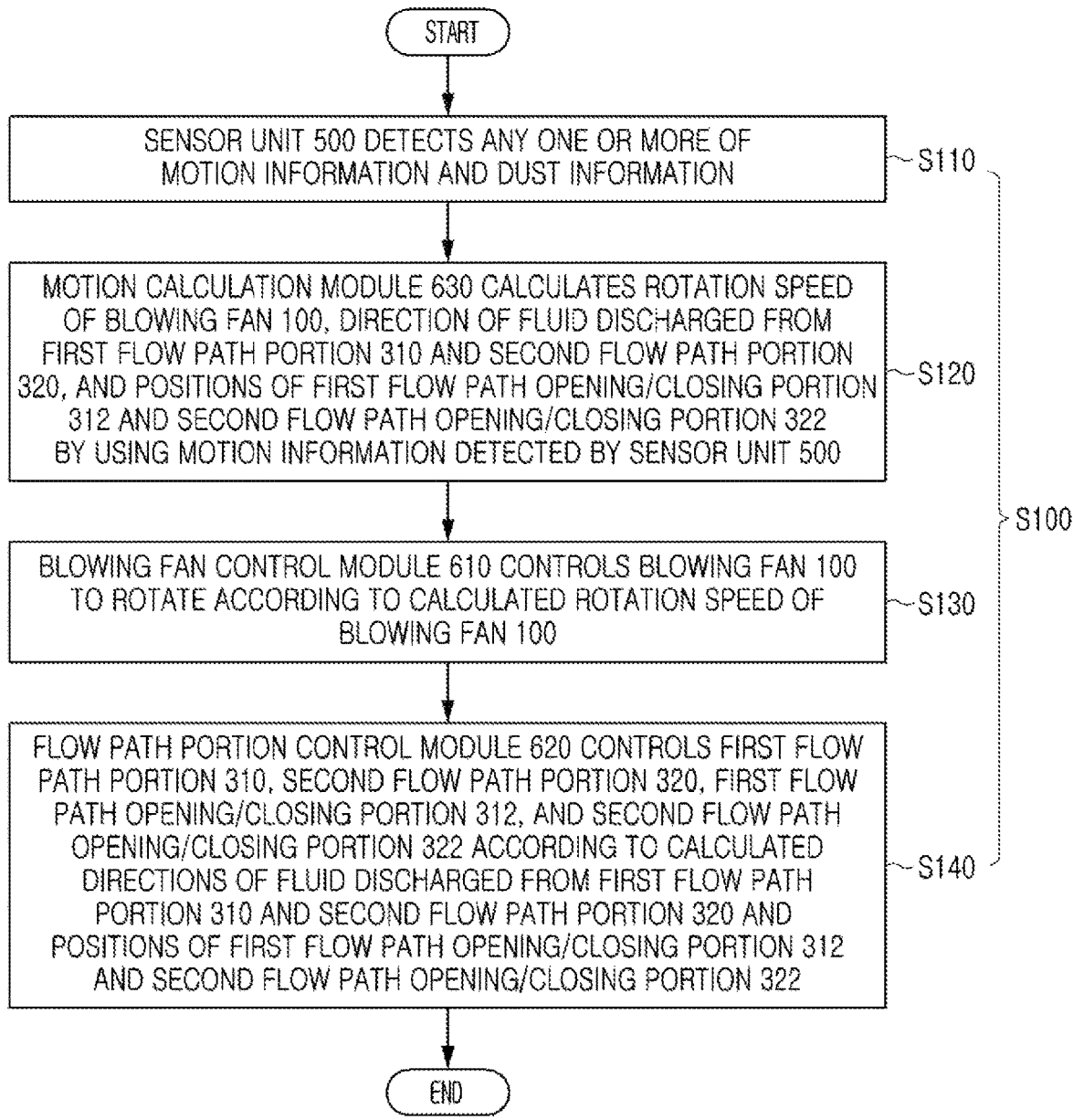
FIG. 14 is a flowchart illustrating a process in which the air purifier according to an embodiment is controlled according to motion information detected by a motion sensor.

Referring to FIG. 14, first, the sensor unit 500 detects any one or more of motion information and dust information (S110).

As described above, the sensor unit 500 includes a motion sensor 510 and a dust sensor 520 and can detect both motion information and dust information. In the present embodiment, a process of controlling the air purifier 1 by using the motion information detected by the motion sensor 510 will be described.

Next, the motion calculation module 630 calculates the rotation speed of the blowing fan 100, the direction of a fluid discharged from the first flow path portion 310 and the second flow path portion 320, and the positions of the first flow path opening/closing portion 312 and the second flow path opening/closing portion 322 by using the motion information detected by the sensor unit 500 (S120).

That is, as described above, the motion calculation module 630 calculates reference information for generating control information of the blowing fan 100 and control information of the flow path portion 300 by using motion information detected by the motion sensor 510.

In this case, the control information of the blowing fan 100 includes information on whether the blowing fan 100 rotates or not and the rotation speed of the blowing fan 100, and the control information of the flow path portion 300 includes a direction of the fluid discharged from the first flow path portion 310 and the second flow path portion 320, i.e., the direction of the clean air and the positions of the first flow path opening/closing portion 312 and the second flow path opening/closing portion 322.

In this case, a method of generating the control information of the blowing fan 100 and the control information of the flow path portion 300 by using the motion calculation module 630 may go through the above-described process.

The control information of the blowing fan 100 and the control information of the flow path portion 300 are transmitted to the blowing fan control module 610 and the flow path portion control module 620, respectively.

First, the blowing fan control module 610 controls the blowing fan 100 to rotate according to the calculated rotation speed of the blowing fan 100 (S130).

That is, the blowing fan control module 610 controls the blowing fan 100 according to the control information of the blowing fan 100 received from the motion calculation module 630.

In addition, the flow path portion control module 620 may control the first flow path portion 310, the second flow path portion 320, the first flow path opening/closing portion 312, and the second flow path opening/closing portion 322 according to the calculated directions of the fluid discharged from the first flow path portion 310 and the second flow path portion 320 and the positions of the first flow path opening/closing portion 312 and the second flow path opening/closing portion 322 (S140).

That is, the flow path portion control module 620 controls the flow path portion 300 according to the control information of the flow path portion 300 received from the motion calculation module 630.

Therefore, according to the method of controlling the air purifier 1 according to the illustrated embodiment, since the generation amount of dust and the accumulation amount of dust are predicted according to the movement of objects and air purification is performed accordingly, the indoor air purification process may be effectively performed.

(2) Description of Process of Controlling Air Purifier 1 According to Dust Information (S200)

Figure 15:
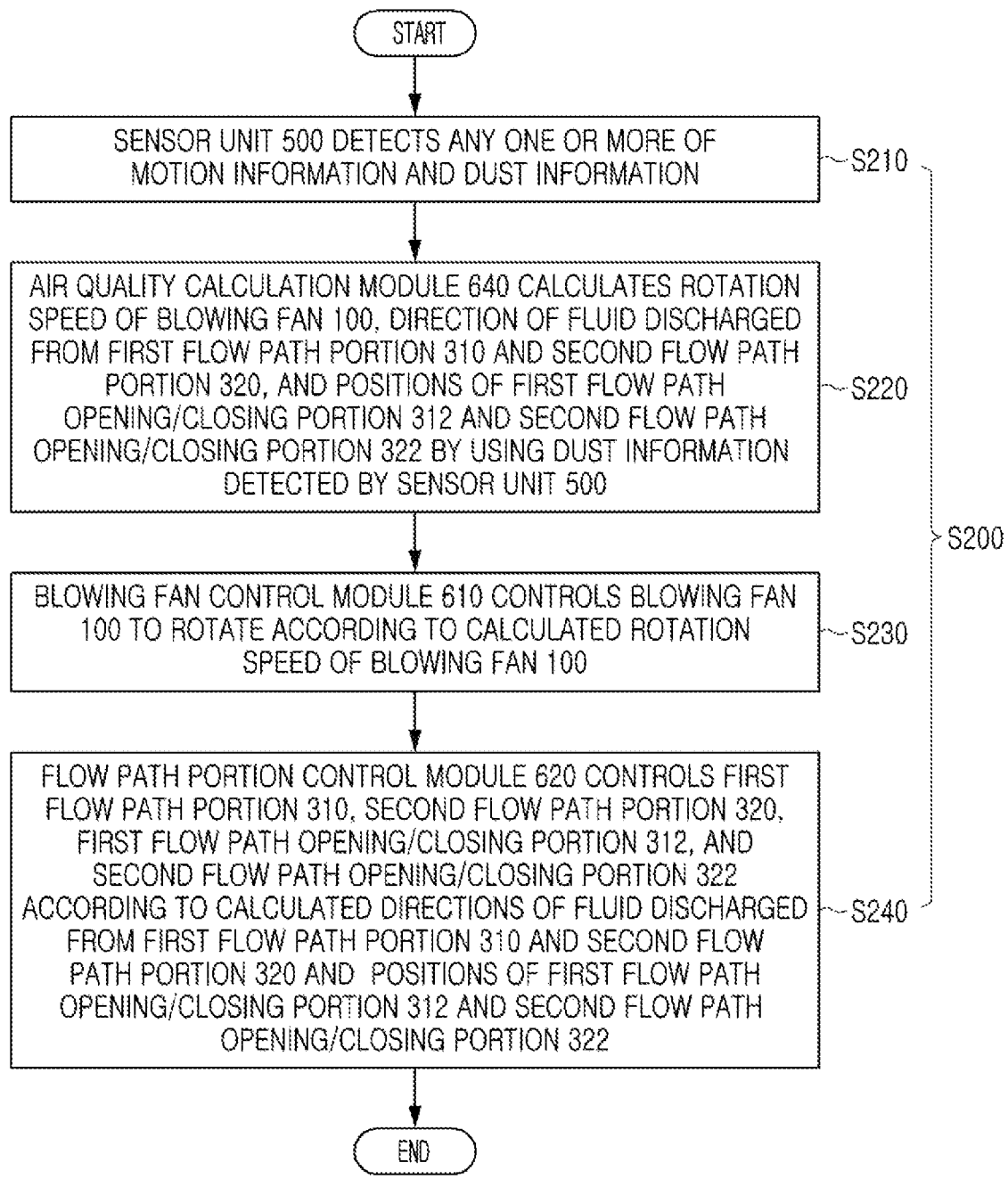
FIG. 15 is a flowchart illustrating a process in which the air purifier according to an embodiment is controlled according to dust information detected by a dust sensor.

Referring to FIG. 15, first, the sensor unit 500 detects one or more of motion information and dust information (S210).

As described above, the sensor unit 500 includes a motion sensor 510 and a dust sensor 520 and may detect both motion information and dust information. In the present embodiment, a process of controlling the air purifier 1 by using the dust information detected by the dust sensor 520 will be described.

Next, the air quality calculation module 640 calculates the rotation speed of the blowing fan 100, the direction of the fluid discharged from the first flow path portion 310 and the second flow path portion 320, and the positions of the first flow path opening/closing portion 312 and the second flow path opening/closing portion. 322 by using the dust information detected by the sensor unit 500 (S220).

That is, as described above, the air quality calculation module 640 calculates reference information for generating the control information of the blowing fan 100 and the control information of the flow path portion 300 by using the dust information detected by the dust sensor 520.

In this case, the control information of the blowing fan 100 includes information on whether the blowing fan 100 rotates or not and the rotation speed of the blowing fan 100, and the control information of the flow path portion 300 includes the direction of the fluid discharged from the first flow path portion 310 and the second flow path portion 320, i.e., the direction of the clean air and the positions of the first flow path opening/closing portion 312 and the second flow path opening/closing portion 322.

In this case, a method of generating the control information of the blowing fan 100 and the control information of the flow path portion 300 by using the air quality calculation module 630 may go through the above-described process.

The control information of the blowing fan 100 and the control information of the flow path portion 300 calculated by the air quality calculation module 640 are transmitted to the blowing fan control module 610 and the flow path portion control module 620, respectively.

First, the blowing fan control module 610 controls the blowing fan 100 to rotate according to the calculated rotation speed of the blowing fan 100 (S230).

That is, the blowing fan control module 610 controls the blowing fan 100 according to the control information of the blowing fan 100 received from the air quality calculation module 630.

In addition, the flow path portion control module 620 may control the first flow path portion 310, the second flow path portion 320, the first flow path opening/closing portion 312, and the second flow path opening/closing portion 322 according the calculated directions of the fluid discharged from the first flow path portion 310 and the second flow path portion 320 and the positions of the first flow path opening/closing portion 312 and the second flow path opening/closing portion 322 (S240).

That is, the flow path portion control module 620 controls the flow path portion 300 according to the control information of the flow path portion 300 received from the air quality calculation module 630.

Therefore, according to the method of controlling the air purifier 1 according to the illustrated embodiment, since the accumulation or floating position is predicted according to the size of the dust having a higher concentration and air purification is performed accordingly, the indoor air purification process can be effectively performed.

According to the present invention, each air purification module can independently perform an air purification function, and air purification modules can be stacked in the vertical direction and coupled to one another to constitute an air purifier, so that the air purifier can be implemented in various capacities according to the area of the indoor space in which the air purification module is installed.

In addition, each air purification module includes a flow path portion through which air is discharged in both directions, thereby adjusting the air discharge direction and discharge amount as necessary so that an air purification mode suitable for indoor air conditions can be performed.

Furthermore, since a user can perform various modes for air purification simply by entering a desired mode without manual operation, air purification can be performed conveniently.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An air purifier comprising a plurality of air purification modules, wherein each of the plurality of air purification modules comprises:
   a blowing fan;
   a flow path dividing portion on which the blowing fan is rotatably mounted;
   a flow path portion comprising a first flow path portion located at one side of the flow path dividing portion and a second flow path portion located at the other side opposite the blowing fan with respect to the one side of the flow path dividing portion;
   a housing accommodating the blowing fan, the flow path dividing portion, and the flow path portion therein,
   a sensor unit located on one side of the air purification modules and comprising a motion sensor for detecting whether an object moves on one side of the air purification modules and a dust sensor;
   a motion calculation module for calculating reference information for calculating the flow path portion control information by using the motion information detected by the motion sensor; and
   wherein the housing comprises a first opening located at one side of the housing and providing a passage through which the first flow path portion is connected in fluid communication with an outside of the housing and a second opening located at the other side of the housing and providing a passage through which the second flow path portion is connected in fluid communication with the outside of the housing, and the first flow path portion comprises a first flow path opening/closing portion located at one side opposite to the blowing fan, and the second flow path portion comprises a second flow path opening/closing portion located at one side opposite to the blowing fan, and the first flow path opening/closing portion is located between a first open position in which the first opening is opened, and a first closing position in which the first opening is closed, and the second flow path opening/closing portion is located between a second open position in which the second opening is opened, and a second closing position in which the second opening is closed, a blowing fan control module for calculating the rotation speed of the blowing fan using the reference information calculated by the motion calculation module; and a flow path control module for controlling the operation status and operation position of the first flow path opening/closing portion and the second flow path opening/closing portion, using the reference information calculated by the motion calculation module are further comprised, and the motion calculation module, when a movement of an object is detected by the motion sensor or no movement of an object is detected for a preset time, calculates the reference information for rotating the blowing fan at a first speed, and the reference information for controlling the operation status and operation position of the first flow path opening/closing portion and the second flow path opening/closing portion, which are in correspondence with the position where the movement of the object is detected or the position where no movement of an object is detected.

2. The air purifier of claim 1, wherein the first flow path opening/closing portion and the second flow path opening/closing portion of each of the plurality of air purification modules are operated independently according to one or more of motion information and dust information detected by the sensor unit.

3. The air purifier of claim 1, wherein the air purification module comprises a sensor unit, the sensor unit comprising a motion sensor and a dust sensor, and wherein whether or not to apply power to the blowing fan and the rotation speed of the blowing fan of each of the plurality of air purification modules are independently controlled according to motion information and dust information detected by the sensor unit.

4. A method of controlling an air purifier (1), the air purifier (1) comprising a plurality of air purification modules (10) of claim 1, the method comprising:

(a) operating the blowing fan (100) by using a blowing fan control module (610); and (b) operating one or more of the first flow path opening/closing portion (312) and the second flow path opening/closing portion (322) by using a flow path portion control module (620).

5. The method of claim 4, wherein the air purifier (1) is operable in a normal mode, and in the normal mode, in (b), the flow path portion control module (620) controls the flow path portion (300) to open both the first flow path opening/closing portion (312) and the second flow path opening/closing portion (322).

6. The method of claim 4, wherein the plurality of air purification modules (10) are stacked in a vertical direction, and the air purifier (1) is operable in a rapid purification mode, and in the rapid purification mode, in (b), the flow path portion control module (620) controls directions of a fluid discharged from the first flow path portion (310) and the second flow path portion (320) of the air purification module (11) located at an upper side among the plurality of air purification modules (10) of the air purifier (1) to be upward and controls directions of the fluid discharged from the first flow path portion (310) and the second flow path portion (320) of the air purification module (12) located at a lower side among the plurality of air purification modules (10) of the air purifier (1) to be downward.

7. The method of claim 4, wherein the air purifier (1) is operable in a remote purification mode, and in the remote purification mode, in (b), the flow path portion control module (620) controls directions of the fluid discharged from the first flow path portion (310) and the second flow path portion (320) to be upward.

8. The method of claim 4, wherein the air purifier (1) is operable in a near-field purification mode, and in the near-field purification mode, in (b), the flow path portion control module (620) controls directions of the fluid discharged from the first flow path portion (310) and the second flow path portion (320) to be downward.

9. The method of claim 8, wherein the plurality of air purification modules (10) are stacked in a vertical direction, and the air purifier (1) is operable in a near-field intensive purification mode, and in the near-field intensive purification mode, in (b), the blowing fan control module (610) controls the rotation speed of the blowing fan (100) of the air purification module (12) located at a lower side among the plurality of air purification modules (10) of the air purifier (1) to be higher than the rotation speed of the blowing fan (100) of the air purification module (11) located at an upper side.

10. A method of controlling an air purifier (1), the air purifier (1) comprising a plurality of air purification modules (10) of claim 2, the method comprising:

(a) detecting one or more of motion information and dust information by using the sensor unit (500);

(b) calculating the rotation speed of the blowing fan (100), directions of a fluid discharged from the first flow path portion (310) and the second flow path portion (320), and positions of the first flow path opening/closing portion (312) and the second flow path opening/closing portion (322) using the motion information detected by the sensor unit (500), wherein the calculating is performed by a motion calculation module (630);

(c) controlling the blowing fan (100) according to the calculated rotation speed of the blowing fan (100) by using the blowing fan control module (610); and (d) controlling the first flow path portion (310), the second flow path portion (320), the first flow path opening/closing portion (312), and the second flow path opening/closing portion (322) according to the calculated directions of the fluid discharged from the first flow path portion (310) and the second flow path portion (320) and the calculated positions of the first flow path opening/closing portion (312) and the second flow path opening/closing portion (322), wherein the controlling is performed by the flow path portion control module (620).

11. A method of controlling an air purifier (1), the air purifier (1) comprising a plurality of air purification modules (10) of claim 2, the method comprising:

(a) detecting one or more of motion information and dust information by using the sensor unit (500);

(b) calculating the rotation speed of the blowing fan (100), directions of a fluid discharged from the first flow path portion (310) and the second flow path portion (320), and positions of the first flow path opening/closing portion (312) and the second flow path opening/closing portion (322) using the dust information detected by the sensor unit (500), wherein the calculating is performed by an air quality calculation module (640);

(c) controlling the blowing fan (100) according to the calculated rotation speed of the blowing fan (100) by using the blowing fan control module (610); and (d) controlling the first flow path portion (310), the second flow path portion (320), the first flow path opening/closing portion (312), and the second flow path opening/closing portion (322) according to the calculated directions of the fluid discharged from the first flow path portion (310) and the second flow path portion (320) and the calculated positions of the first flow path opening/closing portion (312) and the second flow path opening/closing portion (322), wherein the controlling is performed by the flow path portion control module (620).

* * * * *